(12) United States Patent
Rabinowitz

(10) Patent No.: US 11,334,475 B1
(45) Date of Patent: May 17, 2022

(54) GRAPH BASED EVENT-DRIVEN COMPUTING

(71) Applicant: Paul Oren Rabinowitz, Richardson, TX (US)

(72) Inventor: Paul Oren Rabinowitz, Richardson, TX (US)

( * ) Notice: Subject to any disclaimer, the term of this patent is extended or adjusted under 35 U.S.C. 154(b) by 0 days.

(21) Appl. No.: 17/307,050

(22) Filed: May 4, 2021

Related U.S. Application Data

(63) Continuation-in-part of application No. 16/950,928, filed on Nov. 18, 2020, now Pat. No. 11,025,526.

(30) Foreign Application Priority Data

Dec. 24, 2020 (IL) .......................................... 279776

(51) Int. Cl.
*G06F 15/177* (2006.01)
*G06F 11/36* (2006.01)
*G06F 9/54* (2006.01)
*G06F 8/33* (2018.01)

(52) U.S. Cl.
CPC ............ *G06F 11/3688* (2013.01); *G06F 8/33* (2013.01); *G06F 9/547* (2013.01)

(58) Field of Classification Search
USPC .......................................................... 709/220
See application file for complete search history.

(56) References Cited

U.S. PATENT DOCUMENTS

| | | | |
|---|---|---|---|
| 2001/0044738 A1 | 11/2001 | Elkin et al. | |
| 2003/0233374 A1 | 12/2003 | Spinola et al. | |
| 2006/0092857 A1* | 5/2006 | Ansari | H04L 45/02 370/254 |
| 2008/0267175 A1* | 10/2008 | Mo | H04L 45/028 370/357 |
| 2010/0040061 A1* | 2/2010 | McGuire | H04L 45/00 370/392 |
| 2011/0228788 A1* | 9/2011 | Thubert | H04L 41/12 370/400 |

(Continued)

FOREIGN PATENT DOCUMENTS

WO    WO 2017/004287    1/2017

OTHER PUBLICATIONS

Letter dated Feb. 16, 2021 related to IDS (10 Pages).
Notice of Allowance dated Feb. 5, 2021 From the US Patent and Trademark Office Re. U.S. Appl. No. 16/950,928. (7 Pages).

*Primary Examiner* — Anthony Mejia

(57) ABSTRACT

A method for modeling and execution of event-driven software applications. Its main parts are the routing graph model, the run time engine and optionally a user interface and automatic configuration modules. The routing graph is comprised of routing and data-processing nodes. Routing nodes are enriched with node-type specific event routing logic. Data-processing nodes process specific types of events and produce output events. The run time engine executes the routing graph model, based on the routing nodes logic and the data-processing nodes processing functions. The user interface component is used to compose and manage the routing graph configuration. The automatic configuration modules combine and configure predefined routing sub-graphs into a resulting routing graph model.

22 Claims, 15 Drawing Sheets

(56) References Cited

U.S. PATENT DOCUMENTS

| | | | |
|---|---|---|---|
| 2013/0207988 A1* | 8/2013 | Artigue | G06T 11/001 345/589 |
| 2014/0075048 A1* | 3/2014 | Yuksel | H04L 45/28 709/242 |
| 2016/0218961 A1* | 7/2016 | Lindem, III | H04L 12/4633 |
| 2017/0171072 A1* | 6/2017 | Bogdanovic | H04L 45/74 |
| 2020/0336553 A1* | 10/2020 | Yeddula | H04L 41/22 |
| 2021/0083962 A1* | 3/2021 | Rabinowitz | H04L 45/02 |

\* cited by examiner

6000

7000

GRAPH BASED EVENT-DRIVEN COMPUTING

RELATED APPLICATIONS

This application claims the benefit of priority of Israel Patent Application No. 279776 filed on Dec. 24, 2020, which claims the benefit of priority of U.S. patent application Ser. No. 16/950,928 filed on Nov. 18, 2020.

This application is also a Continuation-in-Part (CIP) of U.S. patent application Ser. No. 16/950,928 filed on Nov. 18, 2020.

The contents of the above applications are all incorporated by reference as if fully set forth herein in their entirety.

FIELD AND BACKGROUND OF THE INVENTION

Some embodiments described in the present disclosure relate to a computerized system for executing a software program and, specifically, but not exclusively, to an integrated development environment.

As used herewithin, each of the terms "software program" and "computer program" is used to mean a collection of data and computer instructions instructing one or more hardware processors how to operate in order to perform one or more identified tasks. A software program may be organized in one or more intercommunicating components, executed by the one or more hardware processors. Henceforth the terms "software program" and "computer program" are used interchangeably.

For brevity, henceforth the term "event" is used to mean "data event", and the terms are used interchangeably.

As used herewithin, the term "event driven software program" refers to a software program whose control flow, i.e. the order in which data-processing steps of the software program are executed, is driven by data events received by the software program, and additionally or alternatively by other data events generated by one or more data-processing steps of the software program. The term "data-flow", as used herewithin, refers to a sequence of data-processing steps in an identified order, ignoring the actual processing of data.

Software programs are increasingly becoming more complex than before, and there exist software programs comprising hundreds, thousands, and hundreds of thousands of separate computation tasks. The mere size of a software program makes it difficult for a software developer to understand how the software program operates, and consequently makes maintenance and further development of the software program more difficult and thus more expensive. In addition, common code organization practices increase the difficulty of understanding and maintaining software programs.

Commonly, a code base of a software program is organized into separate layers based on technological affinity. For example, user-interface code is kept separate from interfaces (API) code and from server business logic code and so on. This source code organization is not conductive to exploration and understanding of the core functionality of the software program, as functions from different layers of functionality are often executed one after the other in the same execution thread with no correlation to their order in the code base. In addition, code representing a data flow of a software program, and its conditional branching is interleaved with the code for executing data-processing steps, and further abstracted by modern software paradigms such as polymorphism and inversion-of-control. The result is that a data-flow, which in general can be perceived as a sequence of processing steps that are needed to perform a specific task, is hard to discern from the code. Applications that adhere to an event-driven architecture may be even harder to follow as the order of execution may depend on runtime order of processed events.

Not all man-made systems share such complexity related problems. One example would be modern cities, which arguably surpass other man-made systems in their complexity. Modern cities are built around a transportation infrastructure of highways, roads and streets. This built-in infrastructure standardizes transportation around the city and also allows to abstract the problem of orientating and navigating around the city into street maps. These maps are an abstraction of the transportation infrastructure. Street maps can be further enhanced and automated by computerized turn-by-turn navigation systems, simplifying further the task of navigating between any two points in the city. This example shows that a complex system built around an appropriate organizing principle can avoid many of the problems attributed to complexity.

Current large scale software systems do not have a comparable organizing principle that helps in understanding and navigating their processes and code bases. This results in high learning curves and lowers productivity of software teams responsible for developing and maintaining those systems.

SUMMARY OF THE INVENTION

It is an object of some embodiments of the present disclosure to describe a system, a method and mechanisms for modeling, design and execution of an event-driven software program based on a graph-based representation of the software program. This method and mechanisms can also be viewed as a new kind of event-driven software program architecture and an infrastructure that implements this architecture. In some embodiments the disclosed system and method are based on a concept of a routing graph. In such embodiments, the routing graph is a tree shaped graph, i.e. a directed acyclic graph where each child has at most a single parent. In such embodiments the routing graph comprises a plurality of routing nodes that route events to their children or back to their parent, and a plurality of data-processing nodes that process the events, producing additional events, and are leaves of the routing graph.

This graph structure of code functions resides within memory of a computer process or several computer processes, where computer processes may be run either by a single computing device or several such devices interconnected by networking, and is executed by a computer central processing unit (cpu), one or plural.

The routing graph effectively decouples a data-flow of a software program, executed by the plurality of routing nodes, from event data processing, executed by the plurality of data-processing nodes. A hierarchical structure of the routing graph allows to represent the software program as a graph of steps refined by task decomposition. The routing graph also allows to visualize and simulate a flow of events in the software program, separate from specific data processing steps taking place. The effect is a significant streamlining of the main aspects of software applications development, from application design to coding, maintenance and operations.

In addition, the routing graph nodes may serve as a scaffold containing generic functionality that may be implemented once and reused by one or more other software programs built on top of the routing graph. Having this functionality already implemented frees the software developers to focus on the specific tasks that need to be accomplished by the software program.

According to a first aspect of the invention, a system for executing a software program comprises at least one hardware processor adapted for: accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and in each of a plurality of recursive steps, executing one of the plurality of execution nodes by: receiving an event comprising at least some of the program data from the execution node's parent node or from one of the execution node's plurality of child nodes; subject to the execution node being a routing node: providing the event to at least one child node of the execution node's plurality of child nodes, identified according to a routing classification of the execution node; executing the at least one child node in at least one other of the plurality of recursive steps; subject to failing to identify the at least one child node or at least one executed data-processing node descendant from the node in the routing graph, providing the event to the execution node's parent node for execution of the parent node in at least one additional other of the plurality of recursive steps; and subject to the execution node being a data-processing node: accepting the event according to an outcome of applying at least one acceptance test to the event; and subject to accepting the event, applying the data-processing node's processing function to the event's at least some of the program data to produce an outcome event and providing the execution node's parent node with the outcome event for execution of the parent node in at least one further additional other of the plurality of recursive steps.

According to a second aspect of the invention, a method for executing a software program comprises: accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and in each of a plurality of recursive steps, executing one of the plurality of execution nodes by: receiving an event comprising at least some of the program data from the execution node's parent node or from one of the execution node's plurality of child nodes; subject to the execution node being a routing node: providing the event to at least one child node of the execution node's plurality of child nodes, identified according to a routing classification of the execution node; executing the at least one child node in at least one other of the plurality of recursive steps; subject to failing to identify the at least one child node or at least one executed data-processing node descendant from the node in the routing graph, providing the event to the execution node's parent node for execution of the parent node in at least one additional other of the plurality of recursive steps; and subject to the execution node being a data-processing node: accepting the event according to an outcome of applying at least one acceptance test to the event; and subject to accepting the event, applying the data-processing node's processing function to the event's at least some of the program data to produce an outcome event and providing the execution node's parent node with the outcome event for execution of the parent node in at least one further additional other of the plurality of recursive steps.

According to a third aspect of the invention, a software program product for executing a software program comprises: a non-transitory computer readable storage medium; first program instructions for accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and second program instructions for in each of a plurality of recursive steps, executing one of the plurality of execution nodes by: receiving an event comprising at least some of the program data from the execution node's parent node or from one of the execution node's plurality of child nodes; subject to the execution node being a routing node: providing the event to at least one child node of the execution node's plurality of child nodes, identified according to a routing classification of the execution node; executing the at least one child node in at least one other of the plurality of recursive steps; subject to failing to identify the at least one child node or at least one executed data-processing node descendant from the node in the routing graph, providing the event to the execution node's parent node for execution of the parent node in at least one additional other of the plurality of recursive steps; and subject to the execution node being a data-processing node: accepting the event according to an outcome of applying at least one acceptance test to the event; and subject to accepting the event, applying the data-processing node's processing function to the event's at least some of the program data to produce an outcome event and providing the execution node's parent node with the outcome event for execution of the parent node in at least one further additional other of the plurality of recursive steps; wherein the first and second program instructions are executed by at least one computerized processor from the non-transitory computer readable storage medium.

With reference to the first and second aspects, in a first possible implementation of the first and second aspects of the present invention the routing classification of the execution node is selected from the group of routing classifications consisting of: sequential-routing, wherein subject to receiving the event from the execution node's parent node the at least one child node is a first child node of the execution node's plurality of child nodes in an identified order thereof and subject to receiving the event from a child node the at least child node is a consecutive child node following the child node in the identified order; parallel-one-shot-routing, wherein subject to receiving the event from the execution node's parent node the at least one child node consists of the execution node's plurality of child nodes, otherwise no at least one child node is identified; parallel-re-entrant-routing, wherein the at least one child node consists of the execution node's plurality of child nodes subject to a generation counter of the event being less than a maximum generation value, otherwise no at least one child node is identified; parallel-choose-branch-routing, wherein the at least one child node comprises the execution node's plurality of child nodes, subject to a check that that each descendent accepting data-processing node in the at least one child node is a single child node or a descendant of a single child node; and dual-routing, wherein: the execution node's plurality of child nodes is organized in a sequence of groups of child nodes, subject to receiving the event from the execution node's parent node the at least one child node consists of a first group of child nodes according to the sequence of groups of child nodes, and subject to receiving the event from a child node being a member of a group of child nodes, the at least one child node consists of another group of child nodes consecutive to the group of child nodes in the sequence of groups of child nodes.

With reference to the first and second aspects, in a second possible implementation of the first and second aspects of the present invention applying the at least one acceptance test to the event comprises comparing at least one data value of the event's at least some of the program data to at least one reference data value. Optionally, the event further comprises a plurality of metadata values indicative of a plurality of characteristics of the event. Optionally, the at least one hardware processor is further adapted for updating at least one of the plurality of metadata values according to the outcome of applying the at least one acceptance test to the event. Optionally, applying the at least one acceptance test to the event comprises at least one of: comparing at least one other of the plurality of metadata values to at least one reference metadata value, and comparing at least one data value of the payload record to at least one reference data value. Optionally, the at least one hardware processor is further adapted for: in at least one of the plurality of recursive steps when executing an identified execution node of the plurality of execution nodes where the identified execution node is one of the plurality of routing nodes: subject to the identified execution node receiving a first event from the identified execution node's parent node, recording an association between at least one metadata value of the event's plurality of metadata values and the at least one child node identified according to the routing classification of the identified execution node; and in at least one other of the plurality of recursive steps, when executing the identified node: subject to the identified execution node receiving a second event from the identified execution node's parent node and subject to the second event's plurality of metadata values comprising the at least one metadata value, identifying the at least one child node according to the recorded association instead of according to the respective routing classification of the identified execution node.

With reference to the first and second aspects, in a third possible implementation of the first and second aspects of the present invention the at least one hardware processor is further adapted for: accessing a description of the plurality of execution nodes comprising for each of the plurality of execution nodes an association between the execution node and the plurality of child nodes thereof; and generating an executable graph by generating for each of the plurality of execution nodes a plurality of node computer instruction according to the respective description thereof. Optionally, executing one of the plurality of execution nodes comprises executing the plurality of node computer instructions generated therefor. Optionally, accessing the description of the plurality of execution nodes comprises at least one of: retrieving at least one file from a non-volatile digital storage connected to the at least one hardware processor, and receiving at least one file via at least one digital communication network interface connected to the at least one hardware processor.

With reference to the first and second aspects, or the third implementation of the first and second aspects, in a fourth possible implementation of the first and second aspects of the present invention the description of the plurality of execution nodes comprises a description of at least one template execution node. Optionally, the respective description of at least one of the plurality of execution nodes comprises a reference to the description of the at least one template execution node and generating the respective plurality of node computer instruction for the at least one execution node is further according to the description of the at least one template execution node. Optionally, for at least one other of the plurality of execution nodes, generating the respective plurality of node computer instructions thereof comprises adding a plurality of wrapper computer instructions. Optionally, a respective processing function of at least one of the plurality of data processing nodes is a system function, selected from the list of system functions consisting of: handling an exception, unwinding a sequences of event, and session management. Optionally, the at least one hardware processor is further adapted for: accessing another description of another plurality of execution nodes comprising another plurality of data-processing nodes and another plurality of routing nodes and organized in another routing graph having another root node of the other plurality of routing nodes; and adding the other description of the other plurality of execution nodes to the description of the plurality of execution nodes such that the other root node is a child of one of the plurality of routing nodes. Optionally, the at least one hardware processor is further adapted for, while executing the plurality of recursive steps: accessing an updated description of another plurality of execution nodes, where the other plurality of execution nodes comprises at least one of: a new execution node not a member of the plurality of execution nodes and an updated execution node modifying one of the plurality of execution nodes, and additionally or alternatively the plurality of execution nodes comprises at least one removed execution node not a member of the other plurality of execution nodes; and generating an updated executable graph by modifying the executable graph according to the updated description of the other plurality of execution nodes.

With reference to the first and second aspects, or the third implementation of the first and second aspects, in a fifth possible implementation of the first and second aspects of the present invention the at least one hardware processor is further adapted for generating the description of the plurality of execution nodes comprising receiving from a user description data describing the plurality of execution nodes. Optionally, the at least one hardware processor receives the description data via at least one of: a file, an application programming interface (API) executed by the at least one hardware processor, and a user interface executed by the at least one hardware processor. Optionally, the at least one hardware processor is further adapted for displaying a visual representation of the routing graph on at least one display device connected to the at least one hardware processor. Optionally, the visual representation comprises a first display area for displaying at least some of the plurality of routing nodes and a second display area for displaying at least some of the plurality of data-processing nodes. Optionally, the user interface is executed in an integrated development environment (IDE) executed by the at least one hardware processor. Optionally, the IDE further comprises code for: providing a test event to an identified execution node of the routing graph; and comparing at least one test outcome of executing the plurality of recursive steps in response to the test event to at least one expected outcome. Optionally, the IDE further comprises code for debugging execution of the software program when executing the plurality of execution nodes.

With reference to the first and second aspects, in a sixth possible implementation of the first and second aspects of the present invention the at least one hardware processor comprises at least one first hardware processor and at least one second hardware processor. Optionally the routing graph comprises a plurality of sub-graphs, each comprising some of the plurality of routing nodes and some of the plurality of data-processing nodes. Optionally, for at least a first sub-graph of the plurality of sub-graphs, the first sub-graph's respective plurality of routing nodes and plurality of data-processing nodes are executed by the at least first hardware processor, for at least a second sub-graph of the plurality of sub-graphs, the second sub-graph's respective plurality of routing nodes and plurality of data-processing nodes are executed by the at least second hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments belong. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
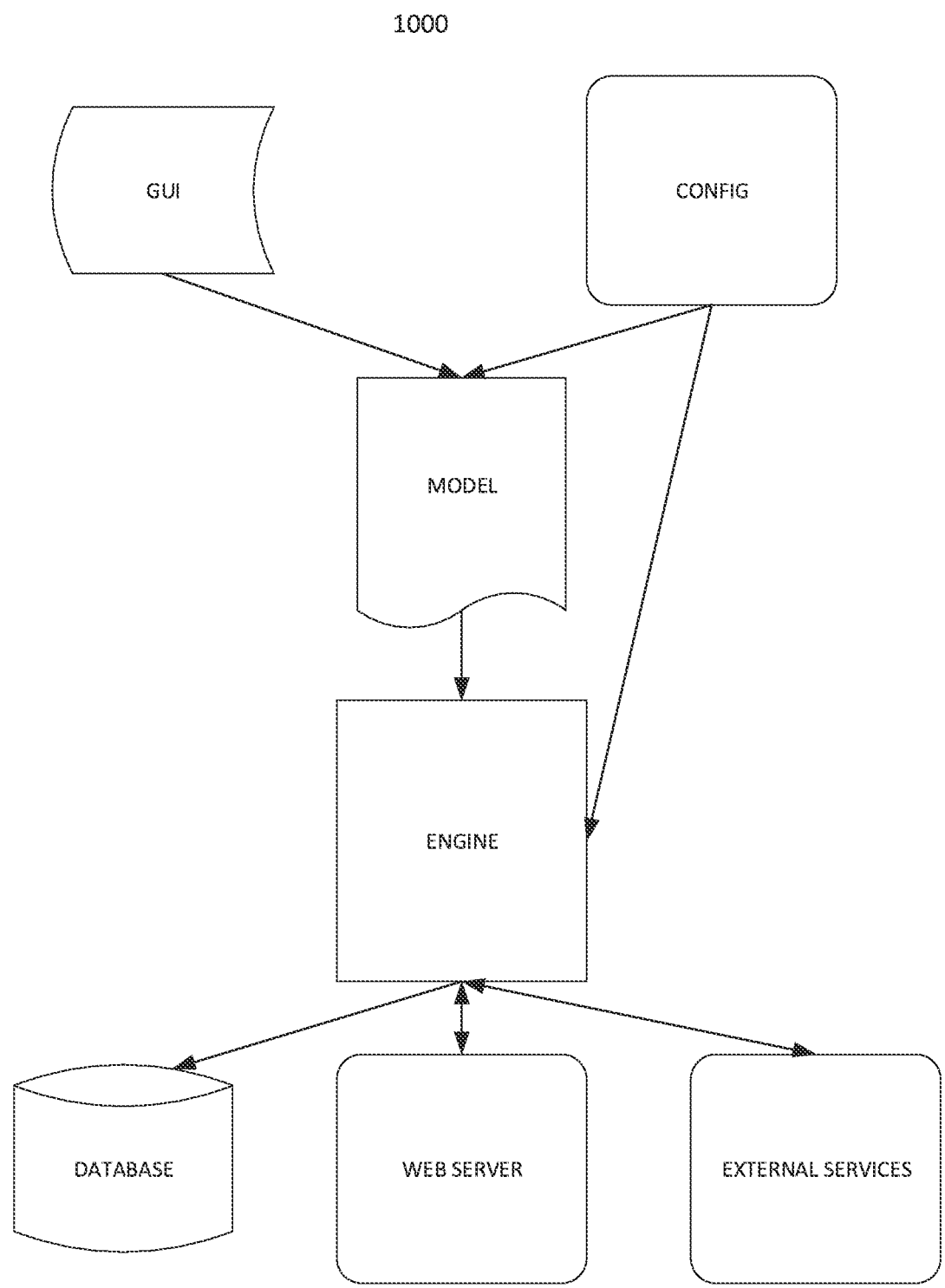
FIG. 1 is a schematic block diagram abstractly illustrating exemplary main components of the routing graph system, according to some embodiments.

A method and mechanisms for modeling, design and execution of event-driven software applications are disclosed. This method is centered around the routing graph concept explained herewithin.

An identified task of a software program may comprise processing steps of a plurality of technological areas of the software program, for example receiving input data, executing a first business logic processing step in response to the received data, and providing an outcome of executing the business logic processing step as input to a second business logic processing step. In this example the input data is one event, the received data provided to the first business logic processing step is another event, and the outcome provided to the second business logic processing step is yet another event. In this example the data-flow includes three data-processing steps: receiving data, the first business logic processing step and the second business logic processing step, and may be repeated for every new input data. Identifying this data-flow promotes understanding how the software program operates in this example.

However, according to some common organization methods of a software program, code representing a data-flow of the software program is interleaved with other code representing processing steps of the software program. In the example above, code implementing a user-interface may comprise code for checking input data together with code for providing received data to the first business logic processing step. Similarly, code implementing business logic processing steps may comprise code for the first business logic processing step and the second business logic processing step together with code for providing the outcome from the first business logic processing step to the second business logic processing step. Such an organization of code makes it difficult to identify a data-flow combining more than one technological area, thus making it difficult to understand how a task of the software program works. Furthermore, modern software development paradigms such as polymorphism and inversion-of-control further abstract the data-flow and data-processing, making it harder to distinguish between them and thus harder to identify how a task of the software program works. There is a need to organize a software program in a way that increases the software program's clarity.

A directional acyclic graph (DAG) is a graph comprising a plurality of nodes connected via a plurality of directed edges having no cycles. In a DAG, each edge connects a parent node to a child node, and it is said there is a parent-child relationship between the parent node and the child node, where the child node is a child of the parent node and the parent node is a parent of the child node. A parent node may have more than one child node. A tree is a DAG where one of the plurality of nodes is a root node, having no parent node, and all other of the plurality of nodes have one parent node. A node is an ancestor of another node if there is directed path of nodes, each two consecutive node of the path having a parent-child relationship, connecting the node to the other node. The other node is considered a descendant of the node.

The present disclosure, in some embodiments described within, proposes organizing a software program in a plurality of execution nodes organized in a directional acyclic graph that is a tree, henceforth also called a routing graph; the terms "tree" and "routing graph" are used interchangeably. In such embodiments, the plurality of execution nodes comprises a plurality of data-processing nodes, each having a function of the software program, and a plurality of routing nodes for delivering program data between the plurality of data-processing nodes. Thus, in such embodiments the routing graph is a tree shaped graph comprising a plurality of routing nodes that route events to their children and additionally or alternatively back to their parent, and a plurality of data-processing nodes that are the graph leaves, that process the events, producing additional events.

The plurality of routing nodes may represent one or more data-flows of the software program. The program data may be delivered from one execution node to another execution node using an event comprising at least some of the program data. In such embodiments, the routing graph has one root node of the plurality of routing nodes, and the plurality of data-processing nodes are leaves of the routing graph, each having no children nodes.

The routing graph effectively decouples the data flow, executed by the plurality of routing nodes, from event processing, done by the data-processing nodes. Its hierarchical structure corresponds to process decomposition into ever smaller compound processing steps. It also allows to visualize and simulate the flow of events in the application, separate from the specific data processing steps taking place. The benefit is a significant streamlining of the main aspects of software applications development, from application design to coding, maintenance and operations.

Organizing the software program in a plurality of routing nodes for delivering program data and a plurality of data-processing nodes each having a processing function of the software program allows decoupling one or more data-flows of the software program from one or more processing functions of the software program, increasing clarity of the software program and therefore increasing ease of development and ease of maintenance thereof, thus reducing cost of development and cost of maintenance of a system executing the software program. Increasing ease of development of a software program additionally increases accuracy of the software program, thus increasing accuracy and availability of one or more services provided by a system executing the software program.

Using a tree to organize the plurality of execution nodes facilitates modeling of one or more data-flows of the software program as a sequence of steps, separate from specific data processing steps. Such modeling allows visualization and simulation of a flow of events in the software program, increasing ease of development and maintenance of the software program and thus increasing accuracy of the software program.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "processing unit" is used to mean one or more hardware processors.

System Components

Reference is now made to FIG. 1, showing a schematic block diagram abstractly illustrating exemplary main components of the routing graph system 1000, according to some embodiments, including the GUI editor [GUI] that creates the configuration graph [MODEL], and the run time engine [ENGINE] that executes this model. Routing graph system 1000 includes for illustration purposes additional components that may be integrated with the system, including a specific application code that may edit and configure the routing graph [CONFIG], either the [MODEL], or its run-time representation within the [ENGINE]. Routing graph system 1000 also illustrates third party components used by the run time engine data-processing nodes to provide services like [DATABASE] for data persistence, [WEB SERVER] for accepting requests and sending responses over the web, as well as requesting additional services from web enabled services, and [EXTERNAL SERVICES], which may include $3^{rd}$ party components for additional services access.

Figure 2:
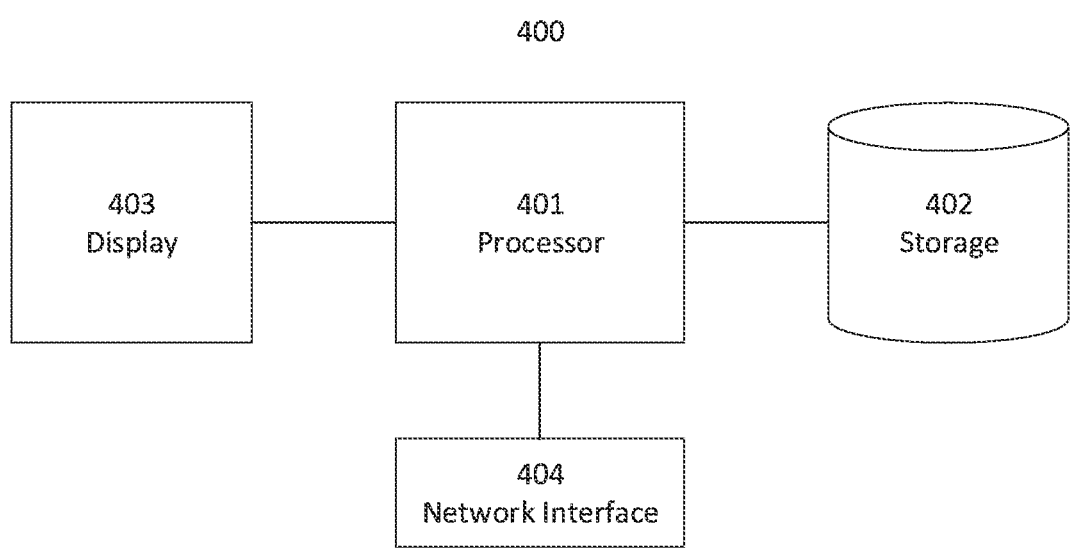
FIG. 2 is a schematic block diagram of an exemplary system, according to some embodiments.

Reference is now made also to FIG. 2, showing a schematic block diagram of an exemplary system 400, according to some embodiments. In such embodiments, processing unit 401 is connected to one or more digital communication network interface 404. Processing unit 401 may receive a description of a software program via one or more digital communication network interface 404. Optionally, processing unit 401 accepts the software program via one or more digital communication network interface 404. When the software program is organized in a plurality of execution nodes, the description of the software program may comprise a description of the plurality of execution nodes. One or more digital communication network interface 404 could be connected to a local area network (LAN), for example an Ethernet network or a wireless network, for example a Wi-Fi network. One or more digital communication network interface 404 could be connected to a wide area network (WAN), for example a cellular network or the Internet.

In various embodiments, processing unit 401 is connected to one or more non-volatile digital storage 402, optionally for the purpose of retrieving the description of the software program. Processing unit 401 may store on one or more non-volatile digital storage 402 one or more executable graphs generated from the description. Some examples of a non-volatile digital storage include a hard disk drive, a solid state drive, a network storage and a storage network. Processing unit 401 can be connected to one or more non-volatile digital storage 402 via one or more digital communication network interface 404. Processing unit 401 may be connected to at least one display 403, optionally for the purpose of displaying a visual representation of an executable graph and additionally or alternatively of one or more of the plurality of execution nodes. Some examples of a display are a computer screen and a monitor.

Data Events

Routing graph engine operates on data events. An event, as used herewithin in the context of the current application, refers to structured computer data. An event can be thought of as a data record, having constituent elements. In the preferred embodiment, data events are split into payload and header sub-records. In some embodiments the header and payload are stored as two sub-records in the same record. Some embodiments may keep header and payload separately, with the header possessing a unique identifier or reference to the payload.

The payload is the structured data being processed.

The header contains elements that describe the payload in terms of its type, a generating data-processing node that generated the event, a preceding event (i.e. an input event to the data-processing node that created the event) and more.

Events can be fed into the system by means of a programmatic interface (API), as well as generated by the data-processing nodes.

The Routing Graph Model

The routing graph model comprises configuration of the routing graph's routing and data-processing nodes. The routing graph model may be used in the engine initialization step to completely or partially initialize the engine run-time routing graph representation. Each node may contain general attributes such as name and type.

A data-processing node configuration contains a definition or a reference to a processing function whose goal is to receive an events' payload record as its input and produce an output record or a sequence of output records. The data-processing node configuration can further specify additional attributes needed for the proper execution of the processing function. These may include initialization parameters, or an initializing function with its initializing parameters. They may also include a list of middleware also referred to as wrapper functions that perform some additional functionality around the processing function, such as catching any exceptions, doing some transformation either on the input or the output and so on. These attributes are described later herein.

Some embodiments may allow template data-processing nodes. A template can represent a multitude of data-processing nodes under the same routing node parent (usually parallel routing nodes which are described further herein). These data-processing nodes will need additional information like name and initial parameters before they are initialized by the run time engine. This information may be provided during the initialization step by invoking code modules or functions specified in the template configuration. These functions may retrieve the missing configuration attributes from external sources, such as a database or files.

A routing node configuration specifies its specific routing logic, or routing node type, and provides a list of its child nodes. Both data-processing nodes and routing nodes types and functionality are further described herein.

Some embodiments may store the routing graph model configuration in a readable structured textual format, with configuration sections for each of its nodes. The configuration sections of the child nodes may be contained or referenced in the configuration section of the parent node.

Engine Main Flow

In the preferred embodiment, engine main flow has several steps. These steps are engine initialization, event processing and shutdown. During initialization the routing graph run-time structure may be created. Some embodiments may edit the run-time routing graph dynamically during the event processing step. During event processing, the engine processes incoming events. At the end of event processing, the optional shutdown step may free and clean up any resources that were in use by the data-processing nodes.

In a system for executing the software program, one or more hardware processors may be adapted for generating the routing graph run-time structure, including the plurality of execution nodes, according to a description thereof. The description of the plurality of execution nodes may comprise for each of the plurality of execution nodes an association between the execution node and a plurality of child nodes of the execution node. In some embodiments, for each of the plurality of data-processing nodes the description comprises a processing function of the software program. Some means for the one or more hardware processors to access the description include, but are not limited to, a file, an application programming interface (API) executed by the one or more hardware processors and a user interface executed by the one or more hardware processors. For example, the description may be stored in one or more Javascript Object Notation (JSON) files.

According to some embodiments, a system executes the software program by executing the plurality of executable nodes. In such embodiments the system executes an engine for executing the plurality of executable nodes. Optionally, executing the software program comprises executing some of the plurality of executable nodes.

In some embodiments, executing the software program comprises recursively traversing at least part of the routing graph and executing at least some of the plurality of execution nodes as the routing graph is traversed. In such embodiments, in each of a plurality of recursive steps one of the plurality of execution nodes is executed in response to an event comprising at least some of the program data. Execution of the plurality of execution nodes may begin with executing the root node of the routing graph, in response to an input event. Alternatively, execution may begin with execution of a data-processing node or another routing node that is not the root node.

Engine Initialization

In some embodiments the run time engine may have an initialization step that precedes the event processing step. Other embodiments may have an initialization step and also dynamically change the routing graph run-time structure during event processing. When initializing from a routing graph configuration, the configuration graph is traversed by the initialization code, and for each configuration node encountered, a run-time node is created and added to the run-time routing graph. For routing nodes, the initialization may create a run time node that corresponds to the routing node type. In the preferred embodiment routing nodes' child nodes are grouped in an enumerating children container and each child has a reference to its parent. For data-processing nodes, the initialization may create a run time node with an embedded processing function code.

Event Processing Flow

In some embodiments, the processing of events consists of the following 2 steps: in step 1 the event is routed to the data-processing nodes that will process the event, in step 2 the event is processed by each of the data-processing nodes that were determined in step 1. Processing data-processing nodes will produce output events (one or plural). These output events will also be treated by the same routing-then-processing two-step logic. The processing ends when there are no more events to process. In the preferred embodiment that happens when a designated data-processing node processing function returns a null value or a special payload value that signals to the engine not to treat the value any further.

Optionally, executing a data-processing node comprises applying the respective processing function of the data-processing node to the event. The data-processing node may provide its parent node with another event. The other event may be an outcome of applying the respective processing function of the data-processing node to the event.

Figure 3A:
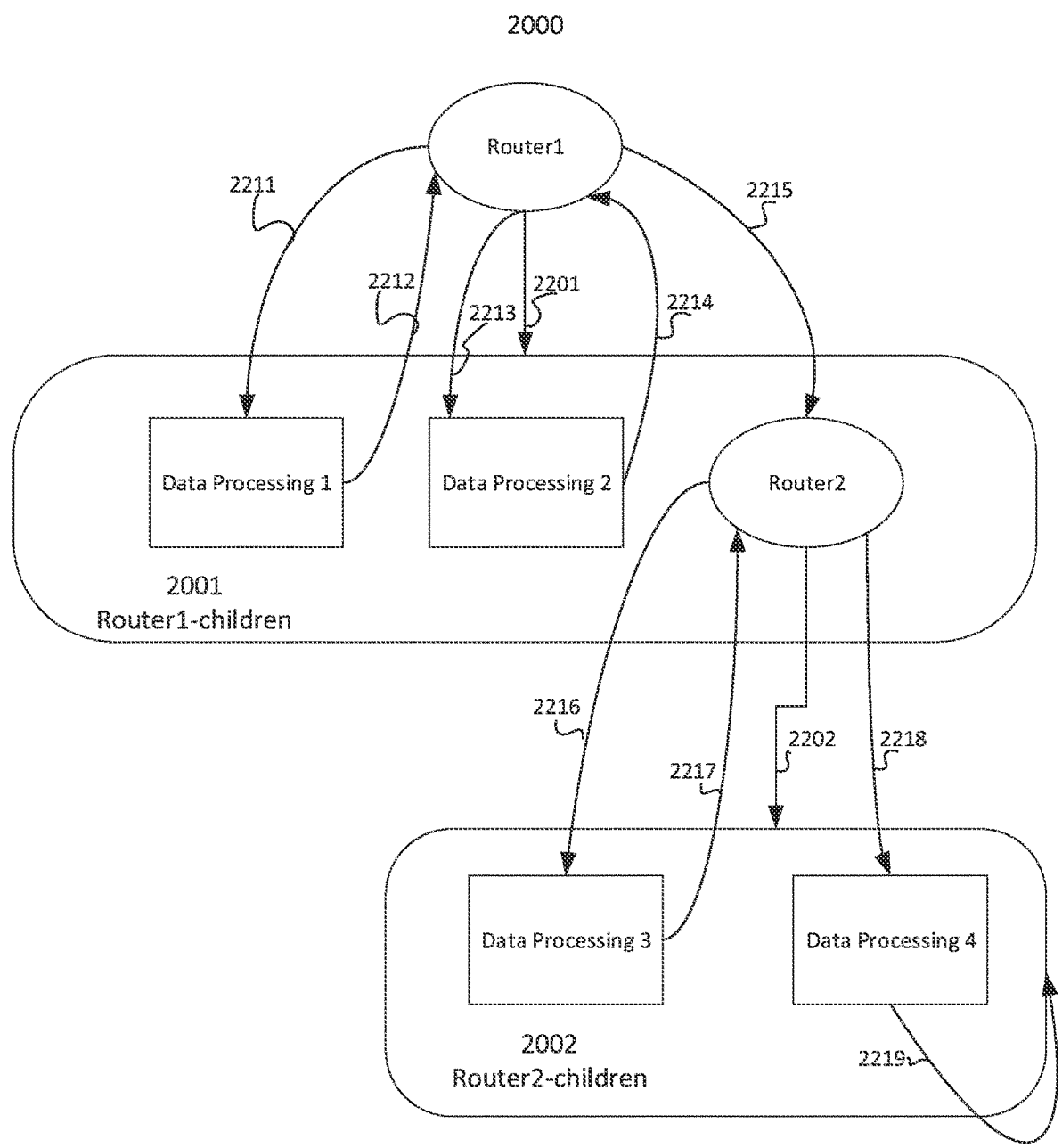
FIG. 3A, is a schematic block diagram illustrating by way of example messages flow in a routing graph 2000, according to some embodiments.

Reference is now made also to FIG. 3A, showing a schematic block diagram illustrating by way of example messages flow in a routing graph 2000, according to some embodiments. Routing graph 2000 may comprise the following in-memory entities that are shown: 2 routing nodes, router1 and router2, having unspecified types, and 4 data-processing nodes: data-processing1, data-processing2, data-processing3 and data-processing4. In such embodiments the router1 node has data-processing1, data-processing2 and router2 as its children. The arrow 2201 illustrates the reference from router1 to its children container 2001. The router2 has data-processing3 and data-processing4 as children nodes. Arrow 2202 illustrates the reference from router2 to its children container 2002. Each data-processing node accepts the output message type of the messages produced by the previous data-processing node. Thus, data-processing2 accepts data-processing1 output, for example of type data-processing2-input-type, data-processing3 accepts the output of data-processing2, for example of type data-processing3-input-type and data-processing4 accepts for example message of type data-processing4-input-type. data-processing4 may return a null value. data-processing1 in this example accepts in 2211 a message of type data-processing1-input-type, routed from router1. data-processing1 can process the message (not shown) of type data-processing1-input-type and produce message2 (not shown) of type data-processing2-input-type. In this example, data-processing1 routes message2 back to its parent router1 in 2212. As router1 in this example is sequential, it routes message2 to the next data-processing node, data-processing2, for example in 2213. In this example, data-processing2 processes message2 event and produces message3 (not shown), which it routes to its parent, router1, for example in 2214. router1 routes message3 to its next child, router2, for example in 2215. router2 routes message3 to its first child, data-processing3, for example in 2216. data-processing3 processes message3 and produces message4 (not shown). It routes, for example in 2217, message4 back to router2, which routes it to the next child, data-processing4, for example in 2218. In this example, data-processing4 processes message4 and its processing function produces a null value, which halts the processing in 2219.

In some embodiments, executing a routing node comprises computing a target set comprising one or more child nodes of the routing node to which the event is provided. Optionally, each of the plurality of routing nodes has a routing classification. The routing classification may be used to compute the target set. A routing node may provide a child node with the event the routing node received from its parent node. A routing node may provide a child node with an outcome event received from another of the routing node's plurality of child nodes.

Figure 3B:
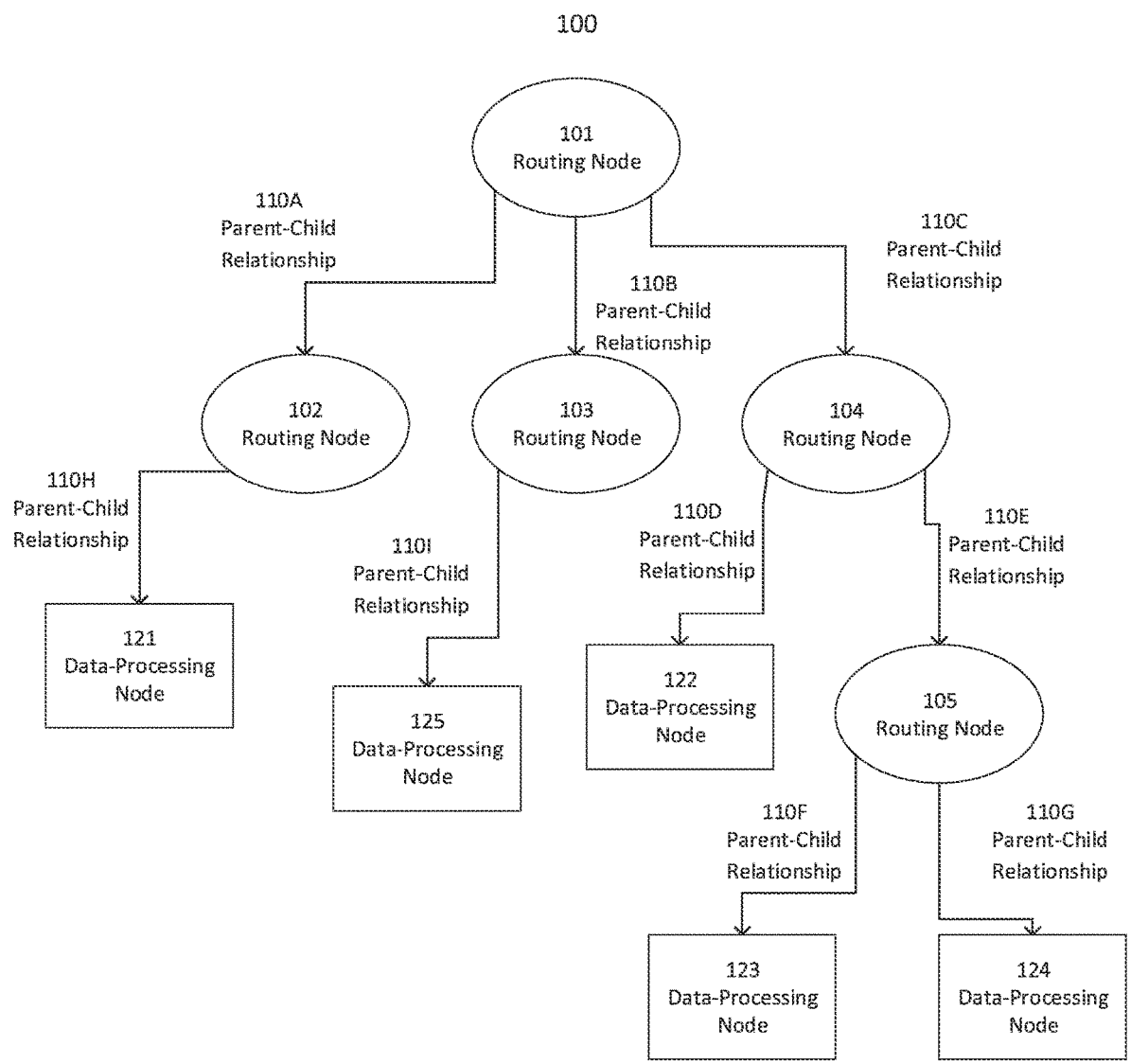
FIG. 3B is a schematic block diagram of an exemplary directional acyclic graph, according to some embodiments.

To illustrate some possible target sets, reference is now made also to FIG. 3B, showing a schematic block diagram of an exemplary routing graph 100, according to some embodiments. In such embodiments, a software program is organized in a plurality of execution nodes organized in routing graph 100. The plurality of execution nodes may comprise a plurality of routing nodes, for example including routing node (RN) 101, RN 102, RN 103, RN 104, and RN 105. In this example, RN 101 is a root node of routing graph 100, having no parent. The plurality of execution nodes may comprise a plurality of data-processing nodes, for example including data-processing node (DPN) 121, DPN 122, DPN 123, DPN 124, and DPN 125. In this example, each of the plurality of data-processing nodes is a leaf of routing graph 100.

According to some embodiments, the plurality of execution nodes has a plurality of parent-child relationships among themselves. Thus, in the example of routing graph 100, RN 101 has three children: RN 102 via parent-child relationship 110A, RN 103 via parent-child relationship 110I, and RN 104 via parent-child relationship 110C. A routing node may have only leaf children, for example DPN 121 is a child-node of RN 102 via parent-child relationship 110H, DPN 125 is a child-node of RN 103 via parent-child relationship 110I and RN 105 has two leaf children: DPN 123 via parent-child relationship 110F and DPN 124 via parent-child relationship 110E. A routing node may have at least one child routing node and at least one data-processing child node, for example RN 104 has two children, DPN 122 via parent-child relationship 110D and RN 105 via parent-child relationship 110E.

To execute a software program, in some embodiments system 400 implements the following optional method.

Figure 4:
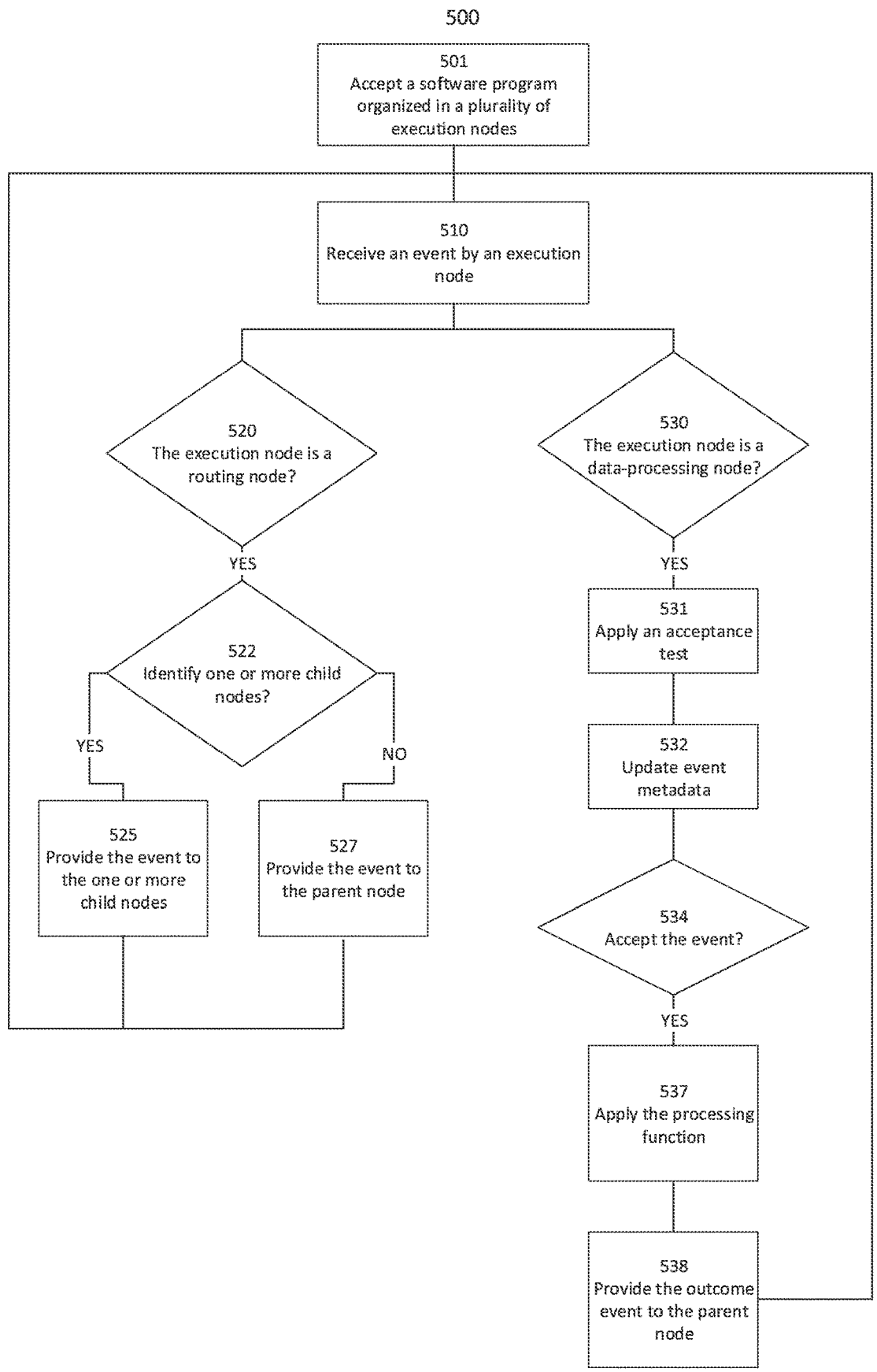
FIG. 4 is a flowchart schematically representing an optional flow of operations for executing a software program, according to some embodiments.

Reference is now made also to FIG. 4, showing a flow-chart schematically representing an optional flow of operations 500 for executing a software program, according to some embodiments. In such embodiments, in 501 processing unit 401 accepts a software program. The software program may be organized in a plurality of execution nodes. In such embodiments, the plurality of execution nodes comprises a plurality of data-processing nodes, for example DPN 121, DPN 122, DPN 123, DPN 124 and DPN 125. Each of the plurality of data-processing nodes may have a processing function of the software program. The plurality of execution nodes may comprise a plurality of routing nodes, for delivering program data between the plurality of data-processing nodes, for example RN 101, RN 102, RN 103, RN 104 and RN 105. In some embodiments, the plurality of execution nodes is organized in routing graph 100. Routing graph 100 could be an executable graph, indicative of an order in which one or more of the plurality of execution nodes should be executed by processing unit 401. Optionally, routing graph 100 has one root node, for example RN 101. Each of the plurality of routing nodes not RN 101, i.e. RN 102, RN 103, RN 104 and RN 105, could each have a parent node of the plurality of routing nodes. In various embodiments, each of the plurality of data-processing nodes, for example DPN 121, DPN 122, DPN 123, DPN 124 and DPN 125 has no child nodes.

In some embodiments, to execute the software program, processing unit 401 executes a plurality of recursive steps, optionally to execute the plurality of execution nodes, optionally according an executable graph equivalent to routing graph 100. In such embodiments, in each of the plurality of recursive steps, processing unit 401 executes one of the plurality of execution nodes. The root node of routing graph 100, RN 101, can be executed in the first of the plurality of recursive steps. Optionally, processing unit 401 executes an engine for executing the plurality of recursive steps. In such embodiments, in each of the plurality of recursive steps the engine executes one of the plurality of execution nodes. The engine may be an executable software object, for example an application or a process of an application.

To execute an execution node of the plurality of execution nodes in a recursive step, in 510 processing unit 401 may receive an event. The event can comprise at least some of the program data. Optionally, the event is received from execution node's parent node. Optionally, the event is received from one of the execution node's plurality of child nodes. When the execution node is the root node of routing graph 100, i.e. RN 101, the event may be received as input to the software program. Optionally, processing unit 401 receives the event via one or more digital communication network interface 404. Optionally, processing unit 401 receives the event via an inter-process communication mechanism from a software executable object executed thereby.

In 520, processing unit 401 can determine whether the execution node is a routing node. Subject to determining the routing node is a routing node, in 522 processing unit 401 may identify one or more child nodes of the execution node. The one or more child nodes of the execution node could be a target set of nodes to which the event is provided. Optionally, processing unit 401 identifies the one or more child nodes according to a routing classification of the execution node.

Subject to identifying one or more child nodes in 522, in 525 processing unit 401 may provide the event to the one or more child nodes. Optionally, processing unit 401 executes the one or more child nodes in one or more of the plurality of recursive steps.

In various embodiments, in 522 processing unit 401 further identifies one or more executed data-processing nodes, where the one or more executed data-processing nodes are descendent from the routing node in routing graph 100.

When failing to identify the one or more child nodes or the one or more executed data-processing nodes, in 527 processing unit 401 can provide the event to the execution node's parent node for execution in one or more additional other of the plurality of recursive steps. Failing to identify the one or more child nodes or the one or more executed data-processing nodes is optionally indicative of a failure to process the event according to a data-flow modeled by routing graph 100.

In 530, processing unit 401 may determine whether the execution node is a data-processing node. Subject to determining the routing node is a data-processing node, in 534 processing unit 401 optionally accepts the event. In some embodiments, processing unit 401 accepts the event according to an outcome of applying in 531 one or more acceptance tests to the event. Accepting the event may depend on the program data, such that applying the one or more acceptance tests to the event comprises comparing one or more data values of the event' at least some of the program data to one or more reference data values.

In some embodiments, the event further comprises a plurality of metadata values indicative of a plurality of characteristics of the event. One example of a metadata value is an event type value. The program data may comprise the event type value. Optionally, in 532 processing unit 401 updates one or more of the plurality of metadata values according to the outcome of applying the one or more acceptance tests to the event, for example updating an event type metadata value according to the one or more program data values.

Accepting the event could depend on the plurality of metadata values, such that applying the one or more acceptance tests to the event comprises comparing one or more other metadata values of the plurality of metadata values to one or more reference metadata values. Additionally, or alternatively, applying the one or more acceptance tests to the event comprises comparing one or more data values of a payload record of the event to one or more reference data values.

Subject to accepting the event in 434, in 547, processing unit 401 optionally applies the data-processing node's processing function to the event's at least some of the program data. Processing unit 401 could apply the respective processing function to produce an outcome event. In 538 processing unit 401 may provide the data-processing node's parent node with the outcome event for execution of the parent node in one or more further additional other of the plurality of recursive steps.

Event Routing

Routing: The routing step is recursive. In the preferred embodiment, the output of the routing step is a set of one or more data-processing nodes that will process the routed event. There are several predefined routing node types. Each has its own routing logic. Each node can only route to its parent (upwards-routing) or to its children (downwards-routing). In the preferred embodiment, routing of an event starts in the first node that encounters or produces the event. First, a downwards-routing could be attempted. When the resulting accepting data-processing nodes set is empty, an upwards-routing can follow. All node types share the upwards-routing logic. In the preferred embodiment, the routing node types differ in the way they determine the set of eligible children to whom they try to route the event during downwards-routing. In the preferred embodiment, the routing node types may also possess node-type specific post-routing validation code.

Data-processing nodes can only route upwards to their routing parent, as they do not have children. Since data-processing nodes always route back to their parent, some embodiments may choose to incorporate the data-processing nodes routing logic as part of the data-processing nodes' parent routing node. These embodiments only have either pure routing nodes or routing nodes with attached processing data-processing nodes. The preferred embodiment treats data-processing nodes as separate graph nodes with their own routing logic.

Upwards-routing: when the set of potential routing children is empty, or if the downwards-routing for all eligible children yielded an empty set of processing data-processing nodes, the node may route the message to its parent routing node. The parent node may then route the event according to its own routing logic. The process stops when the set of next data-processing nodes is non-empty (we say that the event was accepted), or when none of the predecessor routing nodes accepted the event, all the way up to the root of the graph. In the preferred embodiment this situation is treated as a routing exception. Routing exceptions could be treated as system errors that require troubleshooting and a fix in the form of a change to the routing graph configuration or creation code.

Node-type specific downward-routing: In each recursive step, each one of the eligible children can try to route the event. The recursion may end with one or more data-processing nodes. When the child node is a data-processing node, the data-processing node checks whether the event payload type conforms to an input type of the data-processing nodes' function, meaning the processing function is capable of processing the events' payload. When the event payload type conforms to the input type of the data-processing node's function, the data-processing node can be added to the set of events' accepting data-processing nodes. By way of return from the recursive steps, all preceding routing nodes may be aware of the descendant data-processing nodes that accepted the event, and may be considered as accepting routing nodes themselves.

Some embodiments may implement some or all of the following routing node-type specific downward-routing logic:

Sequential Routing Node

One possible example of a routing classification of a routing node is sequential-routing, indicating that events are provided to at least some of the routing node's plurality of child nodes in sequence. When the routing node's routing classification is sequential-routing, when the event is received from the routing node's parent the target set of nodes consists of a first child node of the execution node's plurality of child nodes in an identified order of the execution node's plurality of child nodes.

A sequential routing node can route an event it received from its parent to the first child. The sequential routing node can try to route an event it receives from child in position N to the child in position N+1, unless N is the last child. If N is last position of a child, there are no eligible children left, and so it is required by the upwards-routing rule to forward the event of child N to its parent routing node. If N is not the last child and child N+1 does not accept the event forwarded by child N, the preferred embodiment can ensure that an early-termination routing exception message is created and forwarded to the parent routing node.

Figure 5:
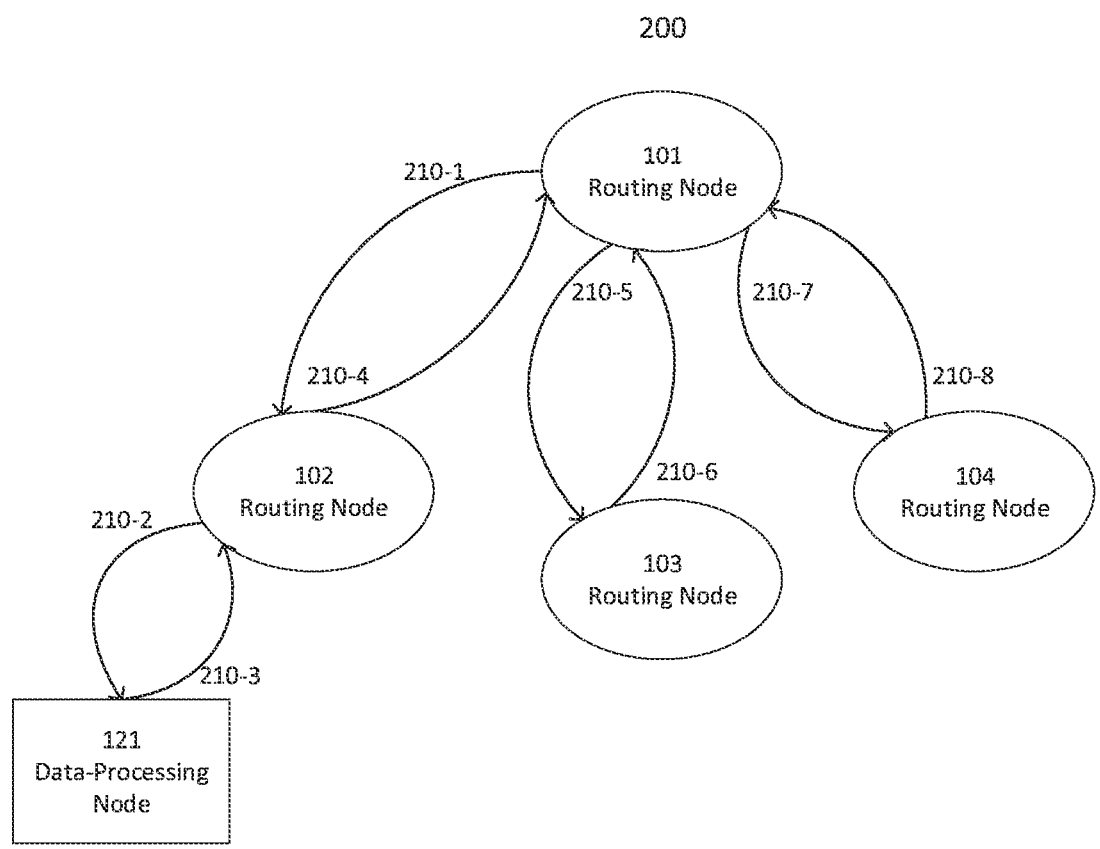
FIG. 5 is a schematic block diagram illustrating sequential routing in part of the exemplary directional acyclic graph, according to some embodiments.

Reference is now made also FIG. 5, showing a schematic block diagram illustrating sequential routing in part of the exemplary routing graph 200, according to some embodiments. When RN 101 has a routing classification of sequential-routing, in each execution of RN 101 the target set comprises at most one of RN 101's plurality of child nodes. When RN 101 is executed in one of a plurality of recursive steps in response to an input event, and similarly when another routing node is executed in response to an event received from the routing node's parent, RN 101 may compute a target set consisting of RN 102, and may provide the input event to RN 102 in 210-1. Optionally, RN 101 declines to provide an event to other children nodes until receiving in 210-4 another event from RN 102. Optionally, RN 101 refrains from providing an event to other children nodes until receiving in 210-4 another event from RN 102.

In some embodiments, RN 102 provides the event in 210 to DPN 121 for execution in another of the plurality of recursive steps, and optionally receives an outcome event from DPN 121 in 210-3. DPN 121 may produce the outcome event by applying DPN 121's respective processing function to the event. In 210-4 RN 102 may provide RN 101 the outcome event.

When RN 101 is provided with the outcome event in 210-4, RN 101 optionally computes, in yet another of the plurality of recursive steps, another target set comprising RN 103 and provides the outcome event to RN 103 in 210-5. RN 103 may provide another outcome event to RN 101 in 210-6. When RN 101 is provided with the other outcome event in 210-6, RN 101 could compute yet another target set comprising RN 104 and could provide the other outcome event to RN 104 in 210-7. RN 104 may provide yet another outcome event to RN 101 in 210-8.

When RN 101 is provided with the yet other outcome event in 210-8, RN 101 may compute an empty target set. When computing an empty target set, RN 101 may provide the yet other outcome event as an output of executing the routing graph (or, similarly, when the other routing node is not a root node of the routing graph, to the parent of the other routing node).

Reference is now made again to FIG. 3B. When executing for example RN 104, a possible order of RN 104's plurality of child nodes is DPN 122, then RN 105. When RN 104's routing classification is sequential-routing, when RN 104 receives the event from its parent, RN 101, processing unit 401 may identify DPN 122 as the target set of nodes. When the routing node's routing classification is sequential-routing, when the event is received from a child node of the routing node, the target set of nodes consist of a consecutive child node following the child node in the identified order. For example, when executing RN 104 and the event is received from DPN 122, processing unit 401 can identify RN 105 as the target set of nodes, where RN 105 is a consecutive node following DPN 122 in the example possible order. When the event is received from a last child node in the identified order, for example from RN 105, processing unit 401 could identify no child node to accept the event, i.e. the target set of nodes is an empty set.

Parallel Routing Nodes

The parallel routing nodes can route events downwards-routed from the parent to all the children. Some embodiments will ensure that the results are independent of the order of execution of the accepting data-processing nodes. A parallel routing node may do so by ensuring that any updates done to an underlying data store by some or any data-processing nodes are not visible to other data-processing nodes that are still processing or waiting to process their respective data event. Some embodiments may execute the resulting processing data-processing nodes in parallel, potentially using several threads of execution.

Figure 6:
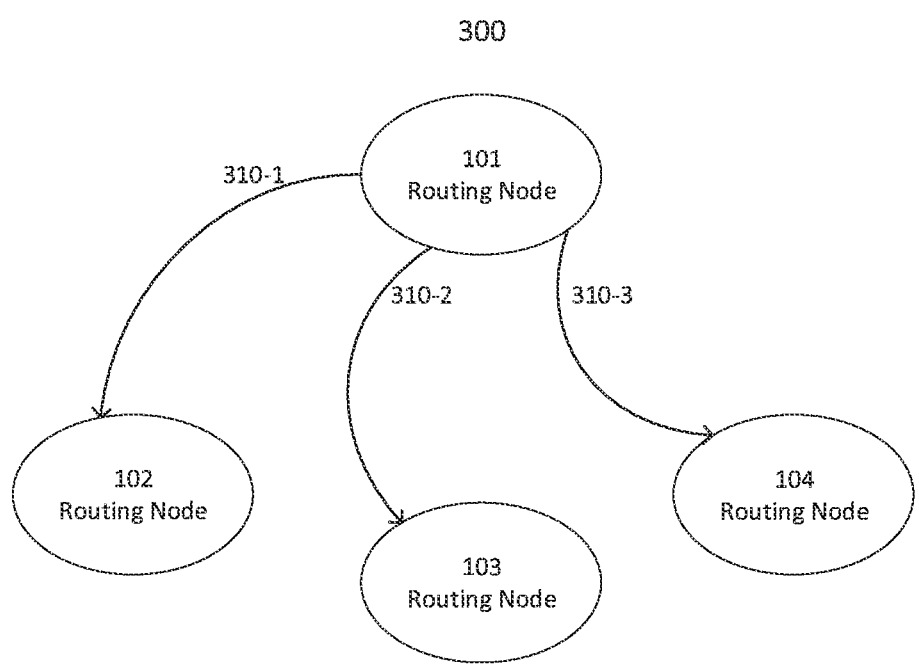
FIG. 6 is a schematic block diagram illustrating parallel routing in part of the exemplary directional acyclic graph, according to some embodiments.

Reference is now made also to FIG. 6, showing a schematic block diagram illustrating parallel routing in part of the exemplary routing graph 300, according to some embodiments. When RN 101 has a routing classification of parallel-one-shot-routing, when RN 101 is executed in response to an input event, and similarly when another routing node is executed in response to an event received from the routing node's parent, RN 101 may compute a target set consisting of RN 102, RN 103, and RN 104, and may provide the input event to RN 102 in 310-1, to RN 103 in 310-2 and to RN 104 in 310-3. Optionally, RN 101 provides the input event to RN 103 and RN 104 without waiting to receive an outcome event from RN 102.

There exists more than one other possible variant of routing classification of a routing node that may be implemented by some embodiments:

Another possible example of a routing classification of a routing node is parallel-one-shot-routing, indicating that an event is provided to the routing node's plurality of child nodes in parallel. When the routing node's routing classification is parallel-one-shot-routing, when the event is received from the routing node's parent the target set of nodes may consist of the execution node's plurality of child nodes. When the routing node's routing classification is parallel-one-shot-routing, when the event is received from a node not the routing node's parent the target set of nodes may be empty and no child node to accept the event is identified. When executing for example RN 105, when the event is received from RN 105's parent, RN 104, processing unit 401 can identify the target set of nodes consisting of DPN 123 and DPN 124. In this example, when the event is received from DPN 122 or DPN 124, processing unit 401 identifies no child node to accept the event, i.e. the target set of nodes is an empty set.

Another possible example of a routing classification of a routing node is parallel-re-entrant routing, indicating that an event received from a child node is provided to the routing node's plurality of child nodes in parallel. In some embodiments, the event has a generation counter. Processing unit 401 may increment the generation counter when processing unit 401 provides the event to the routing node's plurality of child nodes. Optionally, processing unit 401 identifies the routing node's plurality of child nodes as the target set of nodes subject to the generation counter of the event being less than a maximum generation value, for example 2, 10 or 100. When the generation counter is greater or equal to the maximum generation value processing unit 401 could identify no child node to accept the event, i.e. the target set of nodes is an empty set.

Another possible example of a routing classification of a routing node is parallel-choose-branch-routing, indicating that an event received from a child node is provided to the routing node's plurality of child nodes in parallel. When the routing node's routing classification is parallel-choose-branch-routing, when more than one child node of the routing node's plurality of child nodes yields a descendent accepting data-processing node, the routing node can provide the routing node's parent node an exception event, indicative of the more than one child node yielding a descendent accepting data-processing node. When the routing node's routing classification is parallel-choose-branch-routing, the event may be provided to the more than one child node yielding a descendent accepting data-processing node subject to a check that each descendent accepting data-processing node is a single child node or a descendant of a single child node.

In some embodiments, the routing node's plurality of child nodes are organized in a sequence of groups of child nodes. Another possible example of a routing classification of a routing node is dual-routing, indicating that events are provided to the sequence of groups of child nodes, sequentially. An event may be provided to one or more nodes of a group of child nodes in parallel. Optionally, when the routing node's routing classification is dual-routing, when the event is received from the routing node's parent the target set of nodes consists of a first group of child nodes of the sequence of groups. When the routing node's routing classification is dual-routing, when the event is received from a child node which is a member of a group of child nodes, the target set of nodes may consist of another group of child nodes consecutive to the group of child nodes in the sequence of groups of child nodes.

Figure 7:
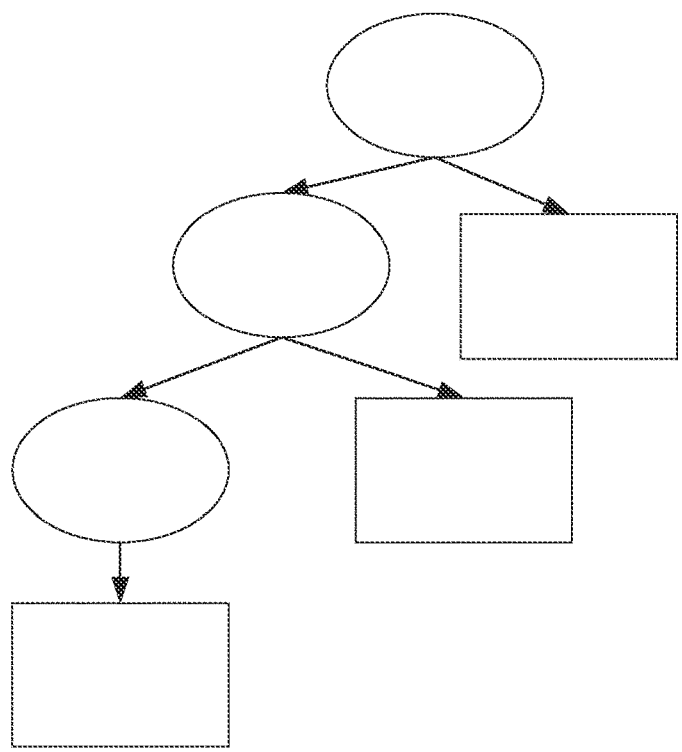
FIG. 7 is a schematic block diagram illustrating by example how a sequential routing node can be mimicked by a string of routing nodes, according to some embodiments.

Reference is now made also to FIG. 7, showing a schematic block diagram illustrating by example how a sequential routing node can be mimicked by a string 6000 of such routing nodes having one routing node child as group A child and one data-processing node child as group B, except the last one, having only a data-processing node child of group A. An event coming in from a parent node may be forwarded by the routing nodes in the sequence, until the last routing node that has a group A data-processing node child. Assuming this child accepts the message, it will process it. Its output message can be forwarded to the routing node that is the before last routing node that will forward it to its group B data-processing node child, and so on. In this manner, the data-processing nodes can be performed sequentially, from the lowest data-processing node to the top-most one. A parallel routing node can be mimicked by a subtree of homogenous routing nodes, each has only group A children.

Figure 8:
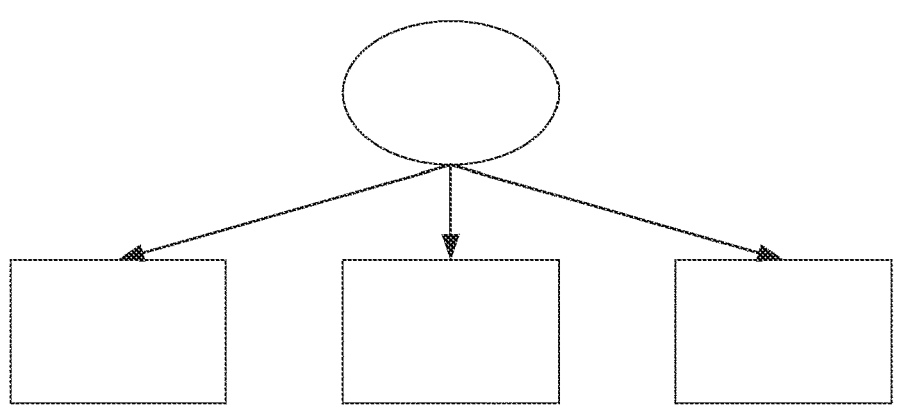
FIG. 8 is a schematic block diagram illustrating an exemplary dual routing node, according to some embodiments.

Reference is now made also to FIG. 8, showing a schematic block diagram illustrating an exemplary dual routing node 7000 having only group A data-processing node children, acting as a parallel one-shot routing node, according to some embodiments.

While a dual routing node may not be convenient to use in practice, the routing logic of the dual routing node demonstrates that the routing logic principle can be viewed as more fundamental and different in nature than a graph of only sequential and parallel nodes graph known in the art, as it is capable of implementing sequential and parallel nodes using a single node type.

The above examples are some possible examples of a routing scheme; other routing classifications, having other routing schemes, may be used. Computing the target set of child nodes to which the routing node provides an event according to a routing classification of the routing node facilitates modelling a large variety of data-flows, increasing usability of the tree to organize the software program.

Data-Processing Nodes

A data-processing node can accept an event from a routing parent, feed the event to its processing function and produce an output event or plural events. The produced event can also be empty (null), a scalar value indicating success or failure, an exception event or a sequence of the previous options. The data-processing node further enhances the produced payload with the event header. Since data-processing nodes do not have children nodes, the output events of a data-processing node are always routed back to the data-processing nodes' parent routing node. Some embodiments may choose to incorporate the data-processing nodes within their parent routing nodes. These embodiments will have either pure routing nodes or routing nodes with attached tasks. The preferred embodiment treats data-processing nodes as separate nodes.

A downward-route step from a parent routing node to a child data-processing node is the last step in the recursive downward-route search. The data-processing node may check whether the message type passed from the parent conforms to the processing function input parameter type. Some embodiments may use the underlying programming language type checks to check for conformance. Some embodiments may use tags to enhance the data-processing node specificity of accepted messages available to the developer of the graph. The tags may be defined as overriding the original message type, or adding to it. Some embodiments can use a Boolean processing function or a multi-choice function either in a separate data-processing node or as a middleware handler as described below, to query the payload and attach a derived (sometimes called narrowing) type tag to the header. In some embodiments tags may be declared as derived from the original types or other tags. This causes data-processing nodes that accept the original type or tag to accept the derived-tag tagged event as well. The opposite does not hold, meaning a data-processing node accepting a derived tag may not accept an event with the initial tag or type. Tags can be used to route the message in the choose-branch or similar routing nodes to the specific data-processing node that accepts only that tag, and not the original payload type. Tags can also be useful in limiting acceptance to specific children in parallel routing nodes as well. Some embodiments using tags may allow only a single tag, while other embodiments using tags may allow a set of tags to be attached to the message. Some embodiments using tags may allow a single tag to be used by the data-processing node conformance check, while other embodiments may allow a set of tags to be used by the data-processing node conformance check. Some embodiments may implement a tags scheme similar to http headers scheme, where tags are also allowed to have values, one or many. When the conformance check returns a positive answer, the data-processing node may be added to the set of accepting data-processing nodes.

Values-based Acceptance is an alternative to the tags mechanism. It comprises a comparison of one or more values to one or more designated values, and is part of the processing node acceptance code. This comparison can be done within a Boolean function that returns true or false. Additionally, or alternatively, this comparison can be done as a sequence of Boolean expressions combined with the Boolean 'and' operator, similar to the condition part of a rule in a rule-based system. The processing function of the data-processing node can be viewed as the action part of the rule. Optionally, the structural condition that checks the type of the event payload can be one of the conditions.

Some embodiments may execute one or more accepting data-processing nodes under task executors that may assign the one or more accepting data-processing nodes to different execution threads or rearrange the execution order in order to optimize the performance of the system.

The examples of routing node types above are not meant to be exhaustive of all possible node type specific routing logics. Some embodiments may define other routing logics that will introduce new routing functionality, or enhance the described above functionality.

Additional Properties

Additional desirable traits of the routing graph system as described so far: There is no need to 'register' event types with the routing graph, as in many other service oriented systems. Some embodiments can compute if the graph accepts any given event type by simulating the routing step. Some embodiments can annotate each node with the set of types it accepts.

In addition, any number of sub-graphs can be combined into a resulting graph, by making their root nodes into children of a parent node or several parent nodes of another routing node graph. In some embodiments described herewithin a routing graph is connected to one or more other routing graphs to produce a new routing graph. For example, a root node of one routing graph may be connected as a child node of a routing node of another routing graph to produce the new routing graph. Connecting one or more routing graphs allows reuse of a routing graph when organizing another software program in the new routing graph, for example to reuse a data-flow of a software program in another software program, reducing development time and increasing accuracy of the other software program.

Figure 9:
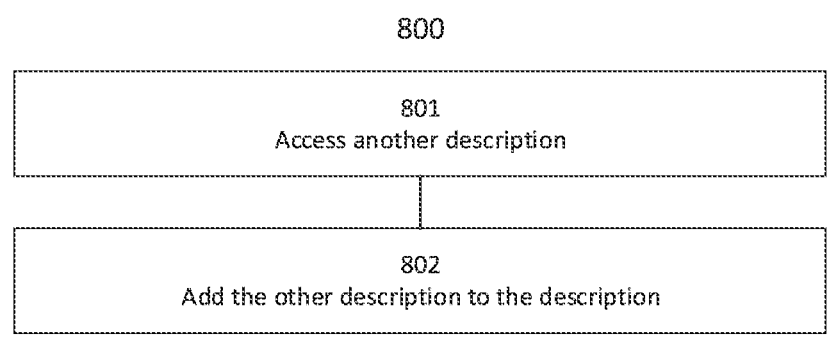
FIG. 9 is a flowchart schematically representing another optional flow of operations for generating an executable graph, according to some embodiments.

In some embodiments, processing unit 401 combines one or more graphs to create a new graph. Reference is now made also to FIG. 9, showing a flowchart schematically representing another optional flow of operations 800 for generating an executable graph, according to some embodiments. In such embodiments, in 801 processing unit 401 accesses another description of another plurality of execution nodes, where the other plurality of execution nodes comprises another plurality of data-processing nodes and another plurality of routing nodes and is organized in another routing graph having another root node of the other plurality of routing nodes. In 802, processing unit 401 may add the other description of the other plurality of execution nodes to the description of the plurality of execution nodes of routing graph 100. Processing node 401 may add the other root node as a child of one of the plurality of routing nodes of routing graph 100.

In some embodiments, a data flow described by one routing graph may be used with other processing functions, for example with other processing functions that are stubs that do not do any actual data processing.

Figure 10:
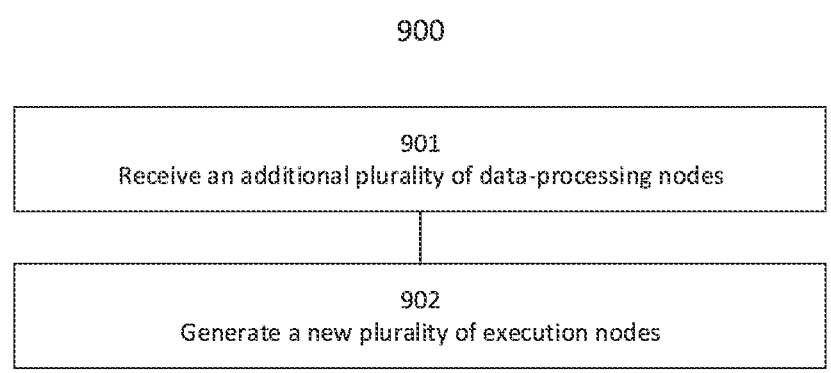
FIG. 10 is a flowchart schematically representing yet another optional flow of operations for generating an executable graph, according to some embodiments.

Reference is now made also to FIG. 10, showing a flowchart schematically representing yet another optional flow of operations 900 for generating an executable graph, according to some embodiments. In such embodiments, in 901 processing unit 401 receives from a user an additional plurality of data-processing nodes. Each of the additional plurality of data-processing nodes could be associated with one of the plurality of routing nodes. In 902, processing unit 401 may generate a new plurality of execution nodes using the plurality of routing nodes of routing graph 100 and the additional plurality of data-processing nodes. In various embodiments, the additional plurality of data-processing nodes stands for the plurality of data-processing nodes of routing graph 100. Optionally, generating the new plurality of execution nodes comprises producing metadata needed to verify routing of events.

Route Caching

Since the routing of an event is dependent only on the event type and the node from which we route the event, and these are constant for all events of the same type routed from the same node, the routing result sets can be cached and reused. This means that we may need to route each event type only once, from the node that introduced the event into the system (either the producing data-processing node or a routing node to which the event was injected using a programmatic interface). Future routing of same event type from the same node will reuse the previously computed result-data-processing nodes set, thus bypassing some or all of the routing steps.

Some embodiments may implement route caching by using a central caching table. Other embodiments may implement route caching by maintaining caching tables local to each node. Some embodiments may implement local node level caching only for data-processing nodes.

Some routing nodes cannot be skipped with route-caching. Examples include, but are not limited to, a routing node that performs additional functionality on the events, and a routing node with a dynamically changed sequence of child nodes. When a routing node cannot be skipped, the routing node may be part of the cached result set. Events may be forwarded to this routing node, possibly using route caching, and this routing node will route the event further, possibly also utilizing route-caching.

Instead of run-time caching, some embodiments implement static analysis that takes into account a type of the data-processing node output event, and simulates its routing to calculate the accepting data-processing nodes set ahead of run-time or during run-time initialization.

Figure 11:
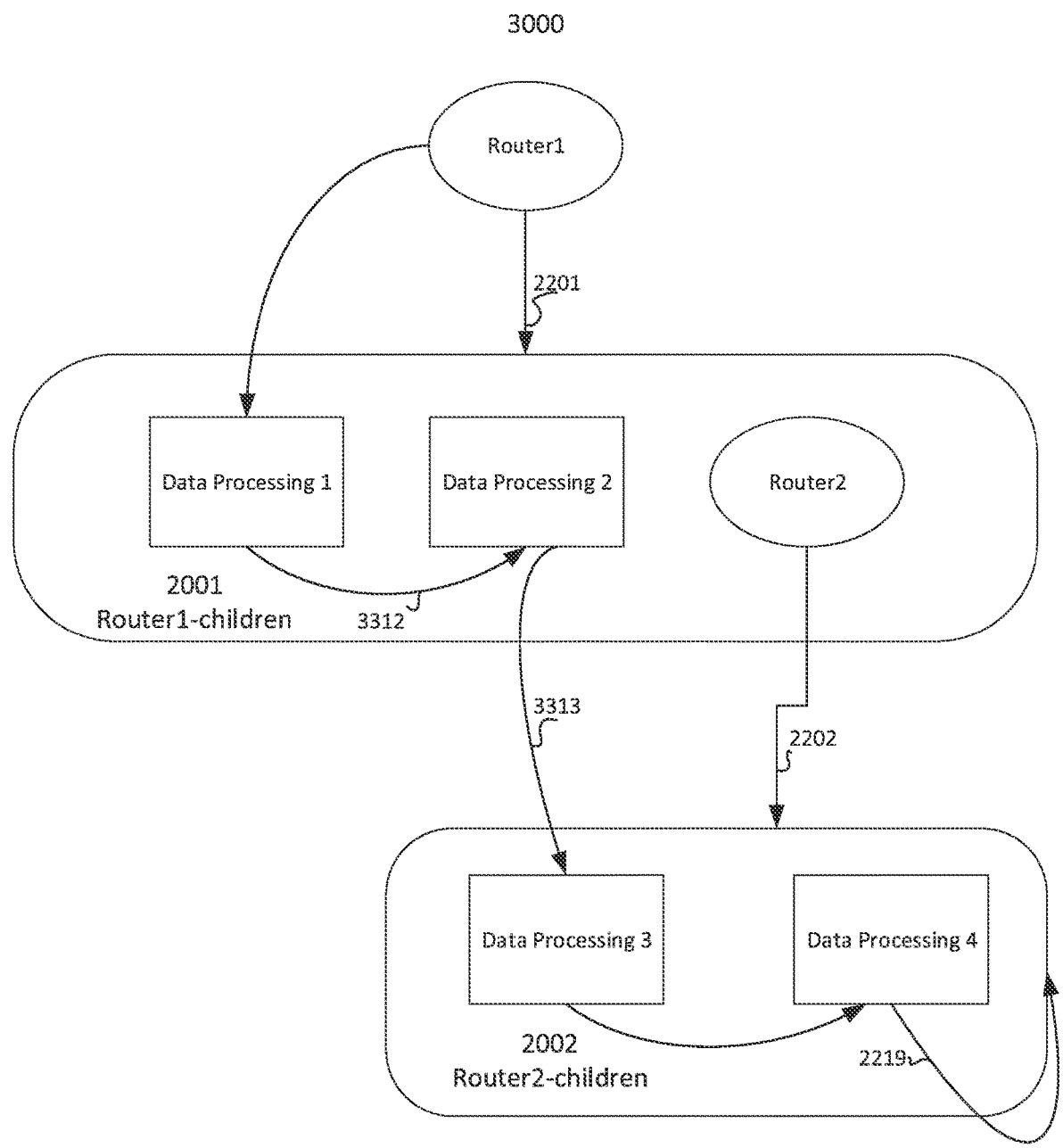
FIG. 11 is a schematic block diagram illustrating an exemplary flow of events with route caching, according to some embodiments.

Reference is now made also to FIG. 11, showing a schematic block diagram illustrating an exemplary flow of events 3000 with route caching, according to some embodiments. In such embodiments the graph is similar to graph 2000 in FIG. 3A. As can be seen, there are much fewer steps involved. It may be assumed that the routing with no caching, such as in FIG. 3A has occurred, and each node remembers, or has cached the target data-processing nodes of each event that was routed from it. For example, data-processing1 remembers that data-processing2 is the target data-processing node for message of data-processing2-input-type type. Thus, it forwards message2 directly to data-processing2, bypassing routing node 1, for example in 3312. In a similar manner, data-processing2 cached data-processing3 as the target for data-processing node for a message of type data-processing3-input-type. data-processing2 forwards its output, message3, directly to data-processing3, bypassing both routing node 1 and router2, for example in 3313.

Since routing nodes are skipped with route-caching, adding child routing nodes of the same type as the parent routing node will not in general degrade performance. It allows a top-down design of the routing graph, based on decomposition of complex computations into meaningful sub-steps, resulting in a more comprehensible routing graph. A readable routing graph can serve as a map of the application.

When Values-based Acceptance (described below) is used, when a data-processing node is returned as part of the caching query, we may first execute the values-based acceptance conditions, and subject to the answer being positive we may add the data-processing node to the result set of data-processing nodes for the currently routed event. Optionally, if many such nodes are returned and need to be checked for acceptance, the implementation may choose to combine the conditions expressions in an optimization scheme known in the art as the Rete engine. The Rete engine is used primarily in rule-based systems to optimize repeated conditions across numerous rules.

Figure 12:
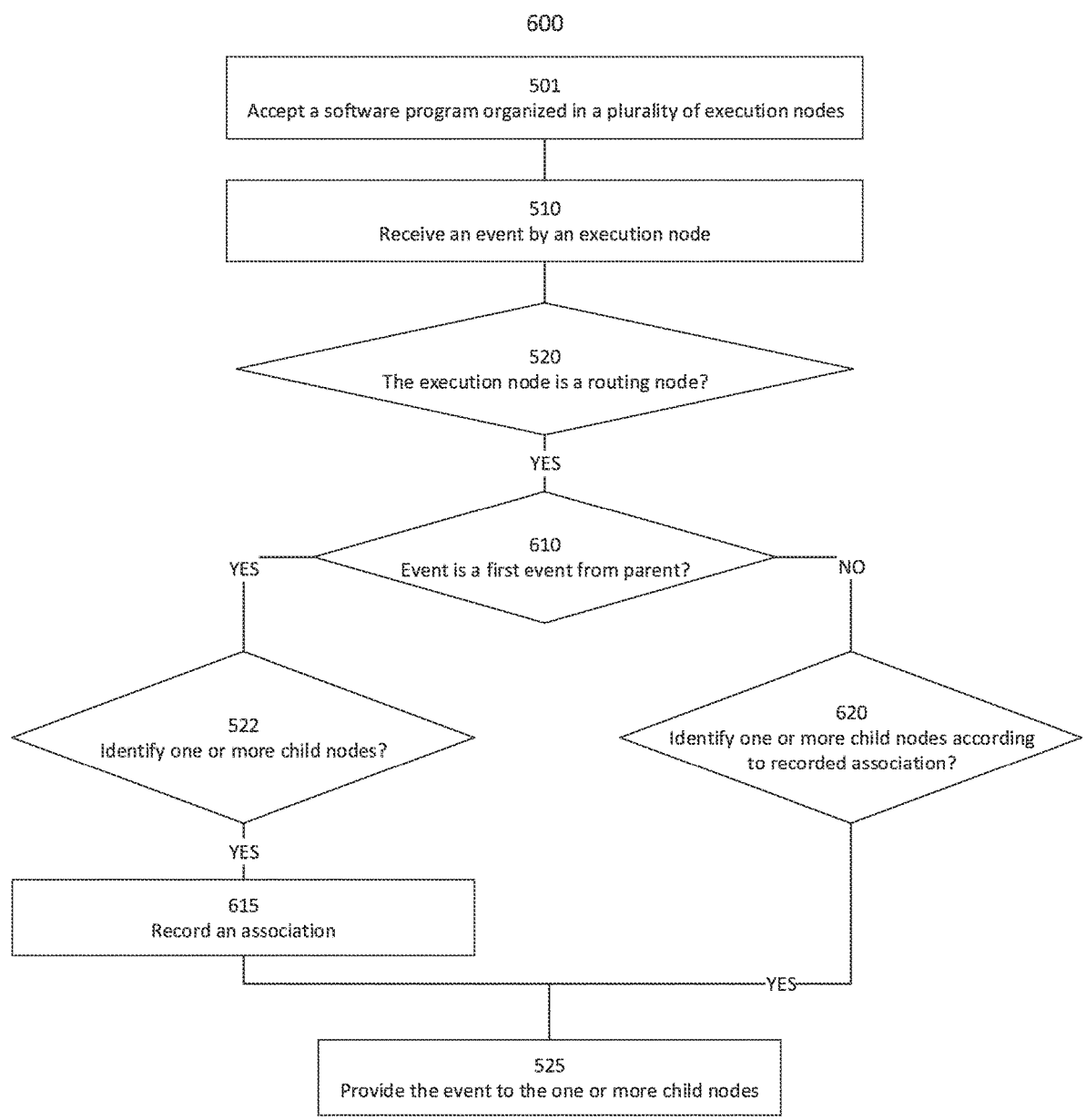
FIG. 12 is a flowchart schematically representing another optional flow of operations for executing a software program, according to some embodiments.

Reference is now made also to FIG. 12, showing a flowchart schematically representing another optional flow of operations 600 for executing a software program, according to some embodiments. In some embodiments, processing unit 401 caches a target set of nodes computed in one of the plurality of recursive steps for use in a future of the plurality of recursive steps. In such embodiments, when in one or more of the plurality of recursive steps, when executing an identified routing node of the plurality of routing nodes, in 610 processing unit 410 identifies whether the event is a first event received from the identified routing node's parent node. Subject to identifying the identified routing node received the first event from the parent node thereof, and subject to identifying the one or more child nodes in 522 executed in the one or more of the plurality of recursive steps, in 615 processing unit 410 can record an association between one or more metadata values of the event's plurality of metadata values and the one or more child nodes identified in 522.

In one or more other recursive steps of the plurality of recursive steps, when executing the identified routing node, in 610 processing unit 410 optionally identifies the event is received from the identified routing node's parent and is not the first event received therefrom, and in 620 processing unit 401 optionally identifies the one or more child nodes, i.e. the target set of nodes, according to the association recorded in 615 instead of according to the respective routing classification of the identified execution node.

Additional Generic Capabilities

Additional generic capabilities can be added to the routing nodes and the task nodes. These capabilities can be developed once and can be available to any process that is created based on the routing graph system, providing a benefit of reducing cost of development and time for development and increasing accuracy of a software application developed using a generic capability. These capabilities aim to free developers from re-implementing generic functionality, allowing the developers to focus on the application functionality. In this sense, the routing graph serves as a scaffold that implements many non-functional concerns on behalf of routing-graph based applications. Some embodiments implement some of these capabilities as middleware handlers. A middleware handler accepts a data-processing node's processing function as input and produces a modified or enhanced processing function as output. The middleware handler essentially wraps the processing function with some additional code that can be run either before or after the processing function itself is run. Middleware handlers can be chained to provide a sequence of such enhancements. Some embodiments define some of the middleware handlers as generic, thus applied for each data-processing node. Some embodiments provide lists of generic as well as specific per-data-processing-node middleware handlers within the routing graph configuration. Each of these handlers may be applied to the processing function during initialization of the data-processing node. This mechanism is beneficial even if the functionality of these handlers can be implemented by additional data-processing nodes, as these additional task nodes can clutter the routing graph and obscure the core functionality. Some embodiments implement some of these capabilities as part of the fixed run time engine code.

In some embodiments, processing unit 401 generates an executable graph from a description of routing graph 100.

Figure 13:
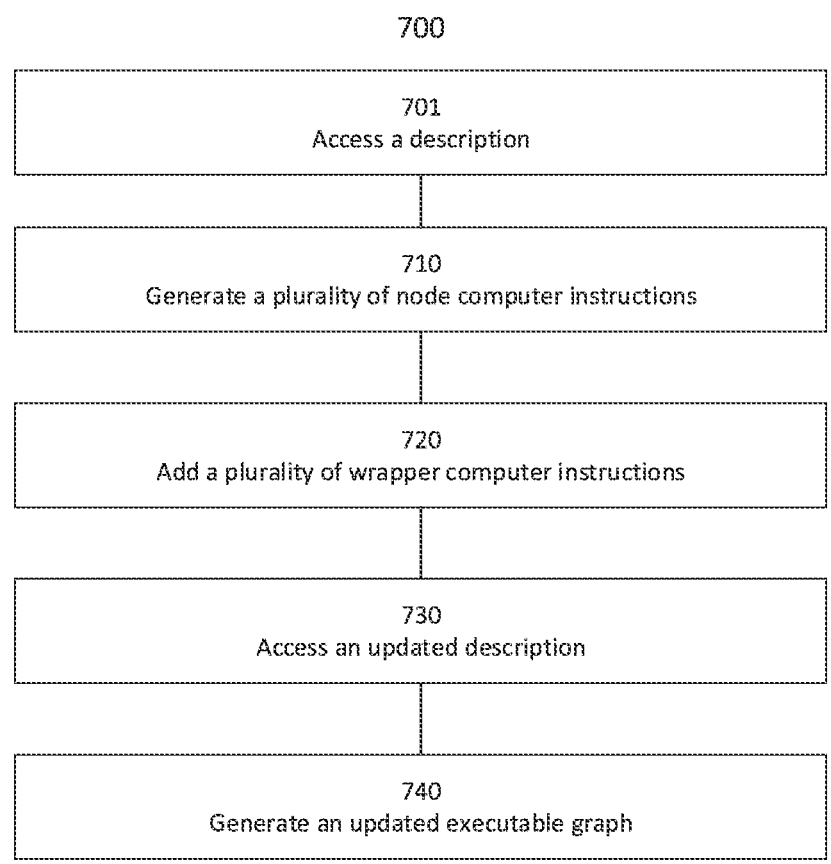
FIG. 13 is a flowchart schematically representing an optional flow of operations for generating an executable graph, according to some embodiments.

Reference is now made also to FIG. 13, showing a flowchart schematically representing an optional flow of operations 700 for generating an executable graph, according to some embodiments. In such embodiments, in 701 processing unit 401 accesses the description of the plurality of execution nodes. The description could be organized in one or more files. Optionally, processing unit 401 accesses the description by retrieving at least one of the one or more files from one or more non-volatile digital storage 402. In some embodiments, processing unit 401 receives at least one other of the one or more files via one or more digital communication network interface 403.

In some embodiments, the description comprises for each of the plurality of execution nodes an association between the execution nodes and the plurality of the execution node's child nodes. Reference is now made again to FIG. 3B. As an example, the description of routing graph 100 comprises for RN 101 an association with RN 102 indicative of parent-child relationship 110A.

Reference is now made again to FIG. 13. Optionally, in 710 processing unit 401 generates an executable graph by generating for each execution node of the plurality of execution nodes a plurality of node computer instructions according to the respective description of the execution node. Executing an execution node of the plurality of execution nodes may comprise executing the plurality of node computer instructions generated for the execution node.

In some embodiments, the description of the plurality of execution nodes comprises a description of one or more template execution nodes. The respective description of one or more of the plurality of execution nodes may comprise a reference to the description of the one or more template execution nodes. Optionally, generating the respective plurality of node computer instructions for the one or more execution nodes is further according to the description of the one or more template execution nodes.

For example, a description of a template execution node may comprise a description of a plurality of operations applied to one or more arguments. In this example, the description of one of the plurality of execution nodes may comprise a reference to the description of the template execution node and at least one argument value of the one or more argument values. In this example, the plurality of node computer instructions is generated according to the plurality of operations and according to the one or more argument value.

The plurality of node computer instructions generated for an execution node may comprise additional instructions in addition to instructions generated according to the node description. Such additional instructions may perform one or more generic tasks—for example capturing an exception, logging, reformatting data, serializing data, authentication, authorization and audit. In 720 processing unit 401 may add to the respective plurality of node computer instructions of the execution node a plurality of wrapper instructions, optionally for performing the one or more generic tasks. The plurality of wrapper instructions may be added before the respective plurality of node computer instructions of the execution node, and additionally or alternatively added thereafter.

A respective processing function of at least one of the plurality of data-processing nodes may be a system function. Some examples of a system function are handling an exception, unwinding a sequence of events, and session management. In 710 processing unit 401 can add to routing graph 100 at least one generic data-processing node having a processing function that is a system function.

Routing graph 100 may be updated dynamically, while processing unit 401 executes the plurality of recursive iterations. In 730 processing unit 401 may access an updated description of another plurality of execution nodes. The other plurality of execution nodes may comprise a new execution node not a member of the plurality of execution nodes. In some embodiments, the other plurality of execution nodes comprises an updated execution node modifying one of the plurality of execution nodes. The plurality of execution nodes may comprise at least one removed execution node not a member of the other plurality of execution nodes. One or more of the new execution node, the updated execution node and the at least one removed execution node could be a routing node. One or more other of the new execution node, the updated execution node and the at least one removed execution node could be a data-processing node. In 740, processing unit 401 optionally generates an updated executable graph by modifying the executable graph according to the updated description of the other plurality of execution nodes. Optionally, processing unit 401 executes at least some of the plurality of recursive steps using the modified executable graph.

Scaling and Distributing Routing Graph Subtrees

Some embodiments implement scalability and availability functionality based on the structure of the routing graph. Each subtree of the routing graph can be viewed as a separate service. The root node of the subtree in the routing graph model may be marked as remoted, i.e. eligible for execution by a separate process. The routing graph application can then be scaled by deploying individual subtrees in separate processes, either on the same computer or on separate computers connected by networking. These processes can additionally be clustered, meaning that the same subtree can be deployed in several processes that are combined into a cluster of processes and treated functionally as a single subtree service. This mechanism allows to allocate the most cost-effective resources when scaling out the various remoted subtrees. For example, some embodiments may use compute nodes with fewer CPU cores and less RAM allocation to scale out a subtree consisting of network or disk related data-processing nodes. This can make economic sense, since adding more CPU cores and RAM may not provide improved networking performance while costing more. On the other hand, subtrees with data-processing nodes performing complex calculations may require more CPU cores and RAM, and perhaps less network capacity. This routing-tree capability is on the framework level, and may be available to any application that is built on top of it.

Some embodiments implement this capability by integrating with a services orchestration framework, also known in the art as container orchestration frameworks, for example the Kubernetes framework. The integration may be in the form of a run-time initialization step code or pre-runtime code that edits the service orchestration framework configuration based on the routing graph configuration.

In some embodiments each compute process contains the complete routing tree configuration, enhanced with remoting configuration (possibly IP addresses and ports of the various subtrees). Some embodiments may choose to initialize only the nodes of subtrees that should be run by the compute process. The complete configuration routing graph may serve as a map specifying where to forward the events. Some embodiments may choose to split the routing graph configuration, so each process has only the subtrees that are run by this process, and the networking information to be able to send and receive events from remoted parent and children subtrees.

As used herewithin, the term "remotable" is used to mean "eligible for execution in a separate process". In the preferred embodiment, each remotable subtree root generates two kinds of proxy instances, one in each process that implements the subtree, at the root position, and an additional proxy instance in each process that includes the subtree root as a child. This child instance of the proxy is the destination for all the events that need to be routed to any node within the subtree. The child proxy can forward all events to the root proxy instance located in a separate process. The root proxy may be responsible to send any events that are to be routed outside the current processes subtree to the child proxy instances in the parent subtrees.

When routing with cache-routing, the proxy routing nodes cannot be skipped.

Leveraging the remoting subtree capability, the routing graph tree can be initially implemented as a single process for development or troubleshooting convenience, and then split into subtrees that will be separately replicated and deployed across multiple computing processes. This provides a seamless path to application-splitting for scalability and availability purposes. Automating the generation of the service or container management configuration streamlines the operational task nodes related to large scale distributed applications.

Figure 14:
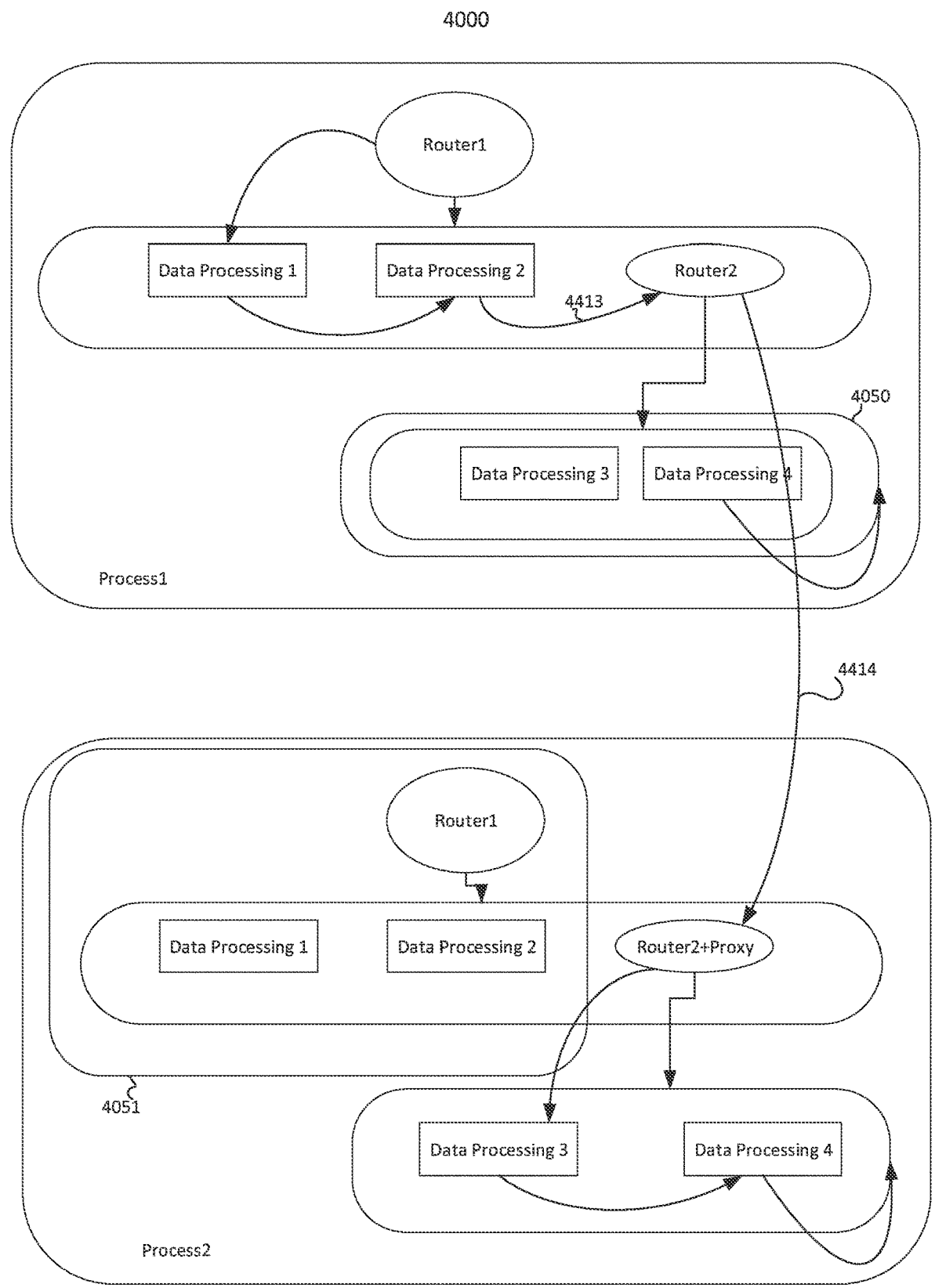
FIG. 14 is a schematic block diagram illustrating by way of example a routing graph, according to some embodiments.

Reference is now made also to FIG. 14, showing a schematic block diagram illustrating by way of example a routing graph 4000 where one of the subtrees, rooted by router2 is deployed on a separate process, or remoted, according to some embodiments. Graph 4000 is similar in functionality to the graph 3000 in FIG. 11. Graph 4000 shows the events flow within each process, and between the processes, involving the two proxy instances, the child instance in process1 and the root proxy in process2, for example in connection 4414. Graph 4000 uses route caching. However, router2, being a proxy node in process1 cannot be skipped by the route caching in 4413. In this illustration, each process possesses the complete routing graph configuration, with some of the nodes not in use. In process1, unused nodes are shown in box 4050 and in process2, the unused nodes are shown in box 4051.

Graphical User Interface

Some embodiments implement a Graphical User Interface (GUI). The GUI may be integrated in an integrated programming environment (IDE). The GUI allows to visualize and edit the routing graph. Some embodiments may display the data-processing nodes in a separate list view.

Reference is now made again to FIG. 2. In some embodiments, processing unit 401 generates the description of the plurality of execution nodes. In such embodiments, generating the description of the plurality of execution nodes comprises receiving from a user description data describing the plurality of execution nodes. Processing unit 401 may store the generated description in a file on one or more non-volatile digital storage 402. Processing unit 401 may receive the description data via a file. Optionally, the file comprises text. Optionally, the file is formatted according to a programming language, for example JSON or Python. Processing unit 401 can execute an application programming interface (API) for receiving the description data from the user. In some embodiments, processing unit 401 executes a user interface, for example graphical user interface, for receiving the description data from the user. Processing unit 401 may execute the user interface in an integrated development environment (IDE). Processing unit 401 may display a visual representation of routing graph 100 on at least one display 403. Optionally, the visual representation distinguishes between one or more data-flows of the software program and one or more processing functions of the software program. The visual representation may comprise a first display area for displaying at least some of the plurality of routing nodes. The visual representation may comprise a second display area for displaying at least some of the plurality of data-processing nodes. In some embodiments, processing unit 401 displays the visual representation in the IDE. The IDE may further comprise code for testing at least part of routing graph 100. For example, the IDE may comprise code for providing a test event to another identified execution ode of routing graph 100. The IDE may comprise code for comparing one or more expected outcomes to one or more test outcomes of executing at least some of the plurality of recursive steps in response to the test event. According to some embodiments, the description of the plurality of execution nodes comprises a description of one or more test events and one or more respective test outcomes. Optionally, comparing the one or more expected outcomes to the one or more test outcomes comprises comparing part of the one or more test outcomes to part of the one or more expected outcomes.

The IDE can comprise code for debugging execution of the software program when executing the plurality of execution nodes. For example, the IDE may comprise code for controlling progress of execution. Optionally, the IDE comprises code for examining one or more values of one or more events and additionally or alternatively of one or more execution nodes.

Figure 15:
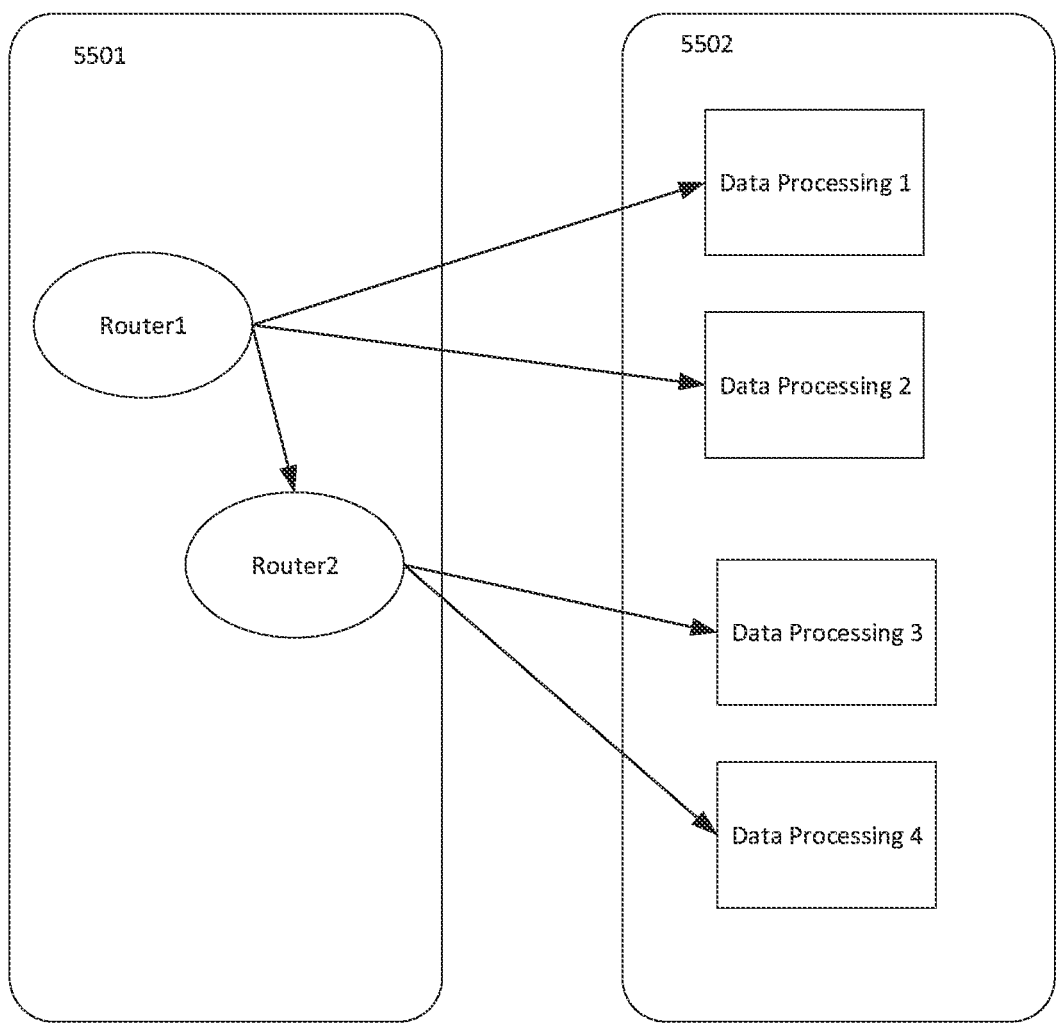
FIG. 15 is a schematic block diagram illustrating a user interface, according to some embodiments.

Reference is now made also to FIG. 15, showing a schematic block diagram illustrating the user interface 5000 where the data-processing nodes are shown in a separate view, according to some embodiments. The data-processing nodes view 5502 shows the data-processing nodes and their processing functions code in the depth-first tree order, which is aligned with the order of their execution. Data-processing nodes view 5502 may be coordinated with the routing graph view 5501, to show only the data-processing node functions that are in a subtree rooted by the routing node selected in the routing graph view. Conversely, selecting a data-processing node in the data-processing nodes view 5502 may highlight the routing nodes on the path of the data-processing node in the routing graph view 5501. Some embodiments may display upon user action the configuration of a data-processing node and allow its editing. Some embodiments may display upon user request the processing function code in a code editor and allow its editing. The code editor may be part of the IDE and also allow debugging of the code. Some embodiments may implement edit of event attribute values, injection of either edited or stored events into various nodes and may also allow to debug the resulting flow of the run time engine. Some embodiments may allow to simulate the events flow in the system, by using dummy data-processing nodes and dummy or empty event payloads. The dummy data-processing nodes are configured to accept specific types or tag values, and produce header tags with specific output type or tag value. This functionality may be valuable when designing the routing graph application. The dummy data-processing nodes are then replaced with actual ones, capable of processing and producing actual payloads.

Some embodiments may treat some routing nodes as chapters in a document, including additional elements such as a subtree view, a textual summary and optionally predefined tests. The tests consisting of a description and sets of input and generated stored events, and optionally automated test-passing checks. The checks allow to selectively compare the attributes of the test-generated events with the attributes of the stored events. The selectivity deemed needed as some attributes such as timestamps are considered ephemeral and not important to the test result.

Heterogeneous Environments

The routing graph subtrees might be implemented on different computing environments. These environments may differ by the computer hardware used, for example having different types of processors, including different CPU types, GPU (graphic processing unit) processors, FPGA (Field-Programmable Gate Array), or specialized processors. They may also include embodiments that are tailored for different surrounding software environments, like in-browser routing graphs or subtrees, different programming environments or routing graphs implemented inside the operating system kernel. In these cases, the transport between two different subtrees of a routing graph might leverage specialized data transports that are suitable for communication between the various environments. Some embodiments may specify several subtrees, each specific to a single environment within a single routing graph. There is a benefit to define and manage a single conceptual process, regardless of the separate processing of the environment-specific subtrees. The various subtrees may need to be treated by different code modules to ensure proper deployment, execution and data events transport for their designated environment.

In some embodiments, processing node 401 comprises two or more hardware processors. In such embodiments, execution of routing graph 100 is distributed between the two or more hardware processors. For example, in some embodiments processing node 401 comprises at least one first hardware processor and at least one second hardware processor. When routing graph 100 comprises a plurality of sub-graphs, a first sub-graph of the plurality of sub-graphs may be executed by the at least one first hardware processor and the second sub-graph of the plurality of sub-graphs may be executed by the at least one second hardware processor.

Each sub-graph may comprise some of the plurality of routing nodes and some of the plurality of data-processing nodes. A sub-graph can comprise one execution node. Thus, the first sub-graph's respective plurality of routing nodes and plurality of data-processing nodes may be executed by the at least one first hardware processor. Reference is now made again to FIG. 3B. When, for example, the first sub-graph comprises RN 102 and DPN 121, RN 102 and DPN 121 may be executed by the at least one first hardware processor. The second sub-graph's respective plurality of routing nodes and plurality of data-processing nodes may be executed by the at least one second hardware processor. When, for example, the second sub-graph comprises DPN 122, DPN 122 may be executed by the at least one second hardware processor.

The present invention may be embodied in other specific forms while still retaining its spirit and essential characteristics. The described embodiments are to be considered in all respects only as illustrative and not restrictive.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant routing nodes and data processing nodes will be developed and the scope of the terms "routing node" and "data processing node" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a software program, comprising at least one hardware processor adapted for:
  accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and in each of a plurality of recursive steps, executing one of the plurality of execution nodes by:
  receiving an event comprising at least some of the program data from the execution node's parent node or from one of the execution node's plurality of child nodes;
  subject to the execution node being a routing node:
    providing the event to at least one child node of the execution node's plurality of child nodes, identified according to a routing classification of the execution node;
    executing the at least one child node in at least one other of the plurality of recursive steps;
    subject to failing to identify the at least one child node or at least one executed data-processing node descendant from the node in the routing graph, providing the event to the execution node's parent node for execution of the parent node in at least one additional other of the plurality of recursive steps; and
  subject to the execution node being a data-processing node:
    accepting the event according to an outcome of applying at least one acceptance test to the event; and
    subject to accepting the event, applying the data-processing node's processing function to the event's at least some of the program data to produce an outcome event and providing the execution node's parent node with the outcome event for execution of the parent node in at least one further additional other of the plurality of recursive steps.

2. The system of claim 1, wherein the routing classification of the execution node is selected from the group of routing classifications consisting of:
  sequential-routing, wherein subject to receiving the event from the execution node's parent node the at least one child node is a first child node of the execution node's plurality of child nodes in an identified order thereof and subject to receiving the event from a child node the at least child node is a consecutive child node following the child node in the identified order;
  parallel-one-shot-routing, wherein subject to receiving the event from the execution node's parent node the at least one child node consists of the execution node's plurality of child nodes, otherwise no at least one child node is identified;
  parallel-re-entrant-routing, wherein the at least one child node consists of the execution node's plurality of child nodes subject to a generation counter of the event being less than a maximum generation value, otherwise no at least one child node is identified;
  parallel-choose-branch-routing, wherein the at least one child node comprises the execution node's plurality of child nodes, subject to a check that that each descendent accepting data-processing node in the at least one child node is a single child node or a descendant of a single child node; and
  dual-routing, wherein:
    the execution node's plurality of child nodes is organized in a sequence of groups of child nodes,
    subject to receiving the event from the execution node's parent node the at least one child node consists of a first group of child nodes according to the sequence of groups of child nodes, and
    subject to receiving the event from a child node being a member of a group of child nodes, the at least one child node consists of another group of child nodes consecutive to the group of child nodes in the sequence of groups of child nodes.

3. The system of claim 1, wherein applying the at least one acceptance test to the event comprises comparing at least one data value of the event's at least some of the program data to at least one reference data value.

4. The system of claim 3, wherein the event further comprises a plurality of metadata values indicative of a plurality of characteristics of the event; and
  wherein the at least one hardware processor is further adapted for updating at least one of the plurality of metadata values according to the outcome of applying the at least one acceptance test to the event.

5. The system of claim 1, wherein the event further comprises a plurality of metadata values indicative of a plurality of characteristics of the event and a payload record; and
  wherein applying the at least one acceptance test to the event comprises at least one of:
    comparing at least one other of the plurality of metadata values to at least one reference metadata value; and
    comparing at least one data value of the payload record to at least one reference data value.

6. The system of claim 4, wherein the at least one hardware processor is further adapted for:
  in at least one of the plurality of recursive steps when executing an identified execution node of the plurality of execution nodes where the identified execution node is one of the plurality of routing nodes:
    subject to the identified execution node receiving a first event from the identified execution node's parent node, recording an association between at least one metadata value of the event's plurality of metadata values and the at least one child node identified according to the routing classification of the identified execution node; and
  in at least one other of the plurality of recursive steps, when executing the identified node:
    subject to the identified execution node receiving a second event from the identified execution node's parent node and subject to the second event's plurality of metadata values comprising the at least one metadata value, identifying the at least one child node according to the recorded association instead of according to the respective routing classification of the identified execution node.

7. The system of claim 1, wherein the at least one hardware processor is further adapted for:
  accessing a description of the plurality of execution nodes comprising for each of the plurality of execution nodes an association between the execution node and the plurality of child nodes thereof; and
  generating an executable graph by generating for each of the plurality of execution nodes a plurality of node computer instruction according to the respective description thereof;
  wherein executing one of the plurality of execution nodes comprises executing the plurality of node computer instructions generated therefor.

8. The system of claim 7, wherein accessing the description of the plurality of execution nodes comprises at least one of: retrieving at least one file from a non-volatile digital storage connected to the at least one hardware processor, and receiving at least one file via at least one digital communication network interface connected to the at least one hardware processor.

9. The system of claim 7, wherein the description of the plurality of execution nodes comprises a description of at least one template execution node;
   wherein the respective description of at least one of the plurality of execution nodes comprises a reference to the description of the at least one template execution node; and
   wherein generating the respective plurality of node computer instruction for the at least one execution node is further according to the description of the at least one template execution node.

10. The system of claim 7, wherein for at least one other of the plurality of execution nodes, generating the respective plurality of node computer instructions thereof comprises adding a plurality of wrapper computer instructions.

11. The system of claim 7, wherein a respective processing function of at least one of the plurality of data processing nodes is a system function, selected from the list of system functions consisting of: handling an exception, unwinding a sequences of event, and session management.

12. The system of claim 7, wherein the at least one hardware processor is further adapted for:
   accessing another description of another plurality of execution nodes comprising another plurality of data-processing nodes and another plurality of routing nodes and organized in another routing graph having another root node of the other plurality of routing nodes; and
   adding the other description of the other plurality of execution nodes to the description of the plurality of execution nodes such that the other root node is a child of one of the plurality of routing nodes.

13. The system of claim 1, wherein the at least one hardware processor comprises at least one first hardware processor and at least one second hardware processor;
   wherein the routing graph comprises a plurality of sub-graphs, each comprising some of the plurality of routing nodes and some of the plurality of data-processing nodes;
   wherein for at least a first sub-graph of the plurality of sub-graphs, the first sub-graph's respective plurality of routing nodes and plurality of data-processing nodes are executed by the at least first hardware processor; and
   wherein for at least a second sub-graph of the plurality of sub-graphs, the second sub-graph's respective plurality of routing nodes and plurality of data-processing nodes are executed by the at least second hardware processor.

14. The system of claim 7, wherein the at least one hardware processor is further adapted for, while executing the plurality of recursive steps:
   accessing an updated description of another plurality of execution nodes, where the other plurality of execution nodes comprises at least one of: a new execution node not a member of the plurality of execution nodes and an updated execution node modifying one of the plurality of execution nodes, and additionally or alternatively the plurality of execution nodes comprises at least one removed execution node not a member of the other plurality of execution nodes; and
   generating an updated executable graph by modifying the executable graph according to the updated description of the other plurality of execution nodes.

15. The system of claim 7, the at least one hardware processor is further adapted for generating the description of the plurality of execution nodes comprising receiving from a user description data describing the plurality of execution nodes.

16. The system of claim 15, wherein the at least one hardware processor receives the description data via at least one of: a file, an application programming interface (API) executed by the at least one hardware processor, and a user interface executed by the at least one hardware processor.

17. The system of claim 7, wherein the at least one hardware processor is further adapted for displaying a visual representation of the routing graph on at least one display device connected to the at least one hardware processor; and
   wherein the visual representation comprises a first display area for displaying at least some of the plurality of routing nodes and a second display area for displaying at least some of the plurality of data-processing nodes.

18. The system of claim 16, wherein the user interface is executed in an integrated development environment (IDE) executed by the at least one hardware processor.

19. The system of claim 18, wherein the IDE further comprises code for:
   providing a test event to an identified execution node of the routing graph; and
   comparing at least one test outcome of executing the plurality of recursive steps in response to the test event to at least one expected outcome.

20. The system of claim 18, wherein the IDE further comprises code for debugging execution of the software program when executing the plurality of execution nodes.

21. A method for executing a software program, comprising:
   accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and
   in each of a plurality of recursive steps, executing one of the plurality of execution nodes by:
      receiving an event comprising at least some of the program data from the execution node's parent node or from one of the execution node's plurality of child nodes;
      subject to the execution node being a routing node:
         providing the event to at least one child node of the execution node's plurality of child nodes, identified according to a routing classification of the execution node;
         executing the at least one child node in at least one other of the plurality of recursive steps;
         subject to failing to identify the at least one child node or at least one executed data-processing node descendant from the node in the routing graph, providing the event to the execution node's parent node for execution of the parent node in at least one additional other of the plurality of recursive steps; and subject to the execution node being a data-processing node:

accepting the event according to an outcome of applying at least one acceptance test to the event; and subject to accepting the event, applying the data-processing node's processing function to the event's at least some of the program data to produce an outcome event and providing the execution node's parent node with the outcome event for execution of the parent node in at least one further additional other of the plurality of recursive steps.

22. A software program product for executing a software program, comprising:

a non-transitory computer readable storage medium;

first program instructions for accepting a software program organized in a plurality of execution nodes comprising a plurality of data-processing nodes, each having a processing function of the software program, and a plurality of routing nodes for delivering program data between the plurality of data-processing nodes, where the plurality of execution nodes is organized in a directional acyclic graph (routing graph) having one root node of the plurality of routing nodes such that each of the plurality of execution nodes not the root node has a parent node of the plurality of routing nodes, each of the plurality of routing nodes has a plurality of child nodes of the plurality of execution nodes, and each of the plurality of data-processing nodes has no child nodes; and second program instructions for in each of a plurality of recursive steps, executing one of the plurality of execution nodes by:

receiving an event comprising at least some of the program data from the execution node's parent node or from one of the execution node's plurality of child nodes;

subject to the execution node being a routing node:

providing the event to at least one child node of the execution node's plurality of child nodes, identified according to a routing classification of the execution node;

executing the at least one child node in at least one other of the plurality of recursive steps;

subject to failing to identify the at least one child node or at least one executed data-processing node descendant from the node in the routing graph, providing the event to the execution node's parent node for execution of the parent node in at least one additional other of the plurality of recursive steps; and subject to the execution node being a data-processing node:

accepting the event according to an outcome of applying at least one acceptance test to the event; and subject to accepting the event, applying the data-processing node's processing function to the event's at least some of the program data to produce an outcome event and providing the execution node's parent node with the outcome event for execution of the parent node in at least one further additional other of the plurality of recursive steps;

wherein the first and second program instructions are executed by at least one computerized processor from the non-transitory computer readable storage medium.

* * * * *